US009560138B2

(12) United States Patent
Gautama et al.

(10) Patent No.: US 9,560,138 B2
(45) Date of Patent: *Jan. 31, 2017

(54) METHODS AND SYSTEMS FOR SECURE COMMUNICATION BETWEEN WIRELESS ELECTRONIC DEVICES AND VEHICLES

(71) Applicant: GM GLOBAL TECHNOLOGY OPERATIONS LLC, Detroit, MI (US)

(72) Inventors: Neeraj R. Gautama, Whitby (CA); Roddi L. Macinnes, Thornhill (CA); Jarvis Chau, Markham (CA); Norman J. Weigert, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,874

(22) Filed: Oct. 7, 2013

(65) Prior Publication Data
US 2015/0100782 A1    Apr. 9, 2015

(51) Int. Cl.
*G06F 21/00*    (2013.01)
*H04L 29/08*    (2006.01)
*H04L 9/32*    (2006.01)
*H04W 12/02*    (2009.01)
*H04W 12/04*    (2009.01)
*H04W 4/04*    (2009.01)
*H04W 4/00*    (2009.01)

(52) U.S. Cl.
CPC .............. *H04L 67/12* (2013.01); *H04L 9/32* (2013.01); *H04W 12/02* (2013.01); *H04W 12/04* (2013.01); *H04L 2209/24* (2013.01); *H04W 4/008* (2013.01); *H04W 4/046* (2013.01)

(58) Field of Classification Search
USPC .................................................. 713/168–175
See application file for complete search history.

(56) References Cited

U.S. PATENT DOCUMENTS

2010/0191973 A1* 7/2010 Huntzicker ......... H04L 63/0823
713/176
2011/0301839 A1* 12/2011 Pudar et al. .................. 701/202

* cited by examiner

*Primary Examiner* — Ghazal Shehni
(74) *Attorney, Agent, or Firm* — Lorenz & Kopf, LLP

(57) ABSTRACT

Methods and systems are provided for communicating with a vehicle. In one embodiment, a portable communication device for communicating with a vehicle is provided. The portable communication device includes memory that stores vehicle specific information. The portable communication device further includes at least one processor that executes instructions that cause the portable communication device to enable a secure communication between a wireless end device and the vehicle based on the vehicle specific information.

26 Claims, 22 Drawing Sheets

METHODS AND SYSTEMS FOR SECURE COMMUNICATION BETWEEN WIRELESS ELECTRONIC DEVICES AND VEHICLES

TECHNICAL FIELD

The technical field generally relates to methods and systems for communicating between wireless electronic devices and vehicles, and more particularly to methods and systems for secure communication between wireless electronic devices and vehicles.

BACKGROUND

The use of wireless end devices such as smart phones, tablets, Bluetooth Low Energy (BLE) gadgets, and other devices has become increasingly popular. Such devices may include applications that may communicate with a vehicle. In order to communicate with a particular vehicle, the wireless end devices must know vehicle specific information. Storing such vehicle specific information on a wireless end device makes the information vulnerable to hackers, malware, viruses, etc. and thus, causes the vehicle to be unsecure.

Accordingly, it is desirable to provide methods and systems for providing secure communications between a wireless end device and a vehicle. In addition, it is desirable to provide methods and systems for providing secure communications between a wireless end device and a vehicle without storing vehicle information on the wireless end device. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for communicating with a vehicle. In one embodiment, a portable communication device for communicating with a vehicle is provided. The portable communication device includes memory that stores vehicle specific information. The portable communication device further includes at least one processor that executes instructions that cause the portable communication device to enable a secure communication between a wireless end device and the vehicle based on the vehicle specific information.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
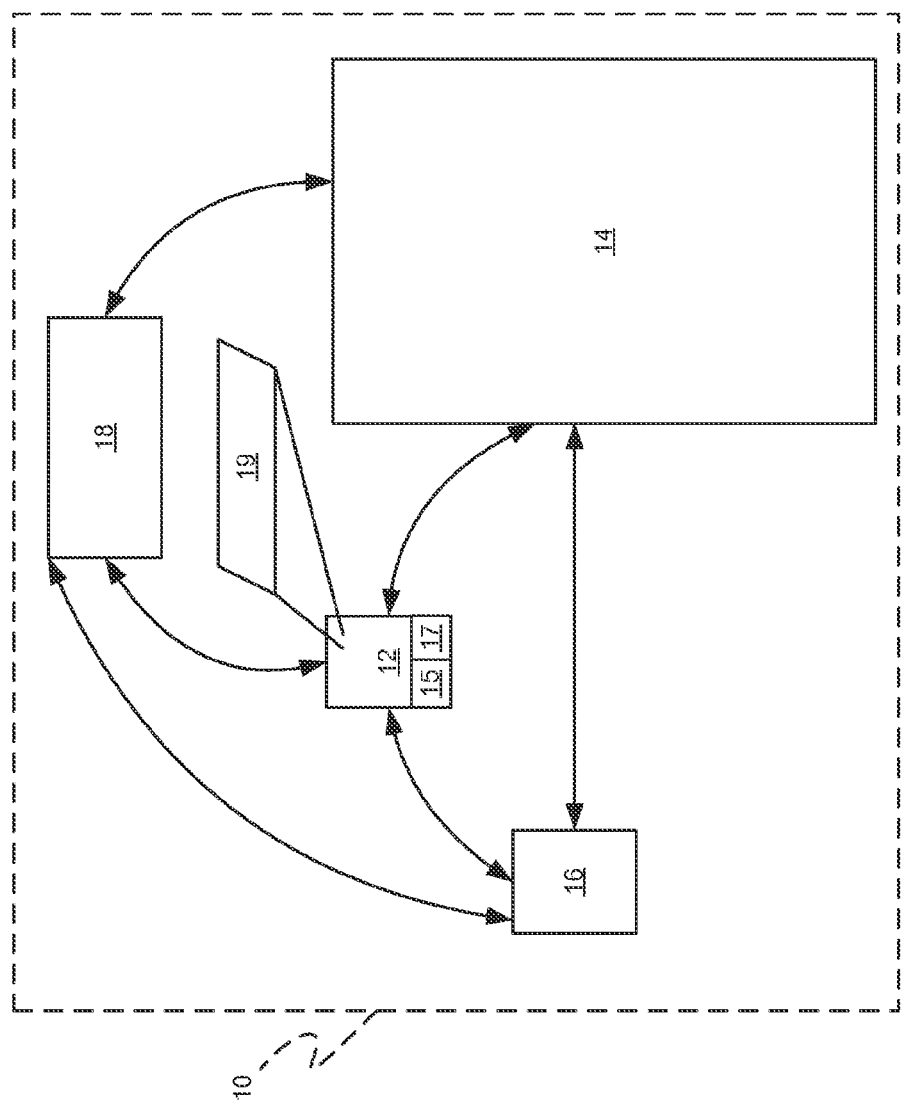
FIG. 1 is a functional block diagram of a communication system that includes a wireless end device and a vehicle in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

FIG. 1 is a functional block diagram of a communication system 10 in accordance with various embodiments. Although the figures shown herein depict an example with certain arrangements of elements, additional intervening elements, devices, features, or components may be present in actual embodiments. It should also be understood that FIG. 1 is merely illustrative and may not be drawn to scale.

As shown, the communication system 10 includes an off-board transceiver (OBT) 12 that is configured to communicate with a vehicle 14, a wireless end device (WED) 16, and/or a remote server 18. In general, the OBT 12 includes one or more memory devices 15, processors 17, transceiver devices (not shown), and power sources (not shown) that communicate over a communication bus (not shown). The one or more memory devices 15 store one or more instructions that are executed by the one or more processors 17. The instructions cause the transceiver devices of the OBT 12 to communicate with the vehicle 14, the WED 16, and/or the remote server 18 according to one or more predefined methods.

As can be appreciated, the one or more memory devices 15 may reside on any type of suitable memory device which may include volatile and non-volatile memory devices. Non-limiting examples of memory devices 15 may include all types of random access memory, flash memory, read only memory (ROM), erasable electronic programmable read only memory (EEPROM), programmable logic devices, magnetic disks, optical disks and any memory devices that currently exist or may be developed in the future. The one or more processors 17 may be any custom made or commercially available processor, a central processing unit (CPU), a semiconductor based microprocessor (in the form of a microchip or chip set), a macroprocessor, or generally any device for executing the instructions. The one or more transceiver devices include, for example, an antenna element and communication circuitry for communicating with the vehicle 14, the WED 16, and/or the remote server 18 according to a predefined communication protocol. Such communication protocol can include, but is not limited to BLE, Wi-Fi, Bluetooth, NFC, ANT, Zigbee, RFID, ultra wide band (low power Wi-Fi), all other variations of Wi-Fi, etc.

As can be appreciated, the OBT 12 may be implemented as any small handheld device. For example, the OBT 12 may be incorporated into a key chain, a key, a key fob, a BLE enabled watch, buttons, stickers, jewelry, a phone case, a phone backing, a wallet card, a biosensor, a purse accessory, a shoe accessory, an athletic accessory, or any other portable device that may be conveniently carried by a user of the vehicle 14. As can further be appreciated, the OBT 12 can be associated with a specific user. In this case, multiple OBTs 12 can be associated with a vehicle 14, one for each user of the vehicle 14.

The vehicle 14 may be an automobile, an aircraft, a spacecraft, a watercraft, a sport utility vehicle 14, or any other type of vehicle 14. The WED 16 may be a smart phone, a tablet, a BLE gadget, or any other electronic device that is capable of communicating with the vehicle 14, the remote server 18, and/or the OBT 12. The remote server 18 may be any computing device located remotely from the vehicle 14, such as OnStar that communicates with the vehicle 14, for example, via the vehicle's telematics system (not shown).

In various embodiments, the OBT 12 enables secure communications to and from the vehicle. For example, the OBT 12 enables secure communications directly between the vehicle 14 and the wireless end device (WED) 16, and/or indirectly between the vehicle 14 and the WED 16 via 14 via the remote server 18. In another example, the OBT 12 enables secure communication between the vehicle 14 and the WED 16 directly or indirectly via the WED 16 communicating with the remoter server 18. In order to enable the secure communications, the OBT 12 is configured such that vehicle specific information is not susceptible to hackers, viruses, malware, etc. In various embodiments, the memory of the OBT 12 stores vehicle specific information 19 that may or may not be encrypted. The OBT 12 then uses the vehicle specific information 19 to verify communications from the WED 16 and/or the vehicle 14. The vehicle specific information 19 includes, for example, a vehicle identification number (VIN) and/or encryption information associated with a particular encryption algorithm used by the OBT 12 and/or the vehicle 14 (i.e., an encryption key). The encryption algorithm may be any encryption algorithm such as an asymmetric or symmetric encryption algorithm.

As will be discussed in more detail below, the OBT 12 stores the vehicle 14 specific information (referred to as etching the OBT 12) during a pairing process that occurs between the OBT 12, the vehicle 14, and the WED 16. The pairing process may occur based on the proximity of the OBT 12 to the WED 16 and the vehicle 14. For example, the pairing process may only occur when the OBT 12, the vehicle 14, and the WED 16 are in close proximity. In another example, the pairing process may only occur when the OBT 12 is in close proximity to the vehicle 14. In either case, the OBT is paired with the vehicle 14 first and the WED 16 is paired with the OBT and/or the vehicle 14 second. The pairing process may determine the proximity, for example, when the vehicle 14 is operating in a certain mode (e.g., an accessory mode, or other mode).

As can be appreciated, the OBT 12 can enable secure communications between the vehicle 14 and multiple WEDs 16 (not shown). In this case, the vehicle specific information 19 may include unique identifiers (UID) for each WED 16, the VIN, and encryption information. In such a case, the OBT 12 may be paired with multiple WEDs 16; however, the OBT 12 is configured to only be authorized to communicate with a single WED 16 at any one time.

As can further be appreciated, the OBT 12 can enable secure communications between the WED 16 and multiple vehicles 14 (not shown). In this case, the vehicle specific information 19 may include VINs for each vehicle 14, and encryption information. In such a case, the OBT 12 may be paired with multiple vehicles 14; however, the OBT 12 is configured to only be authorized to communicate with a single vehicle 14 at any one time.

As can further be appreciated, the OBT 12 can enable secure communications between multiple WEDs 16 (not shown) and multiple vehicles 14 (not shown). In this case, the vehicle 14 information may include VINS for each vehicle 14, UIDs for each WED 16, and encryption information.

Figure 2:
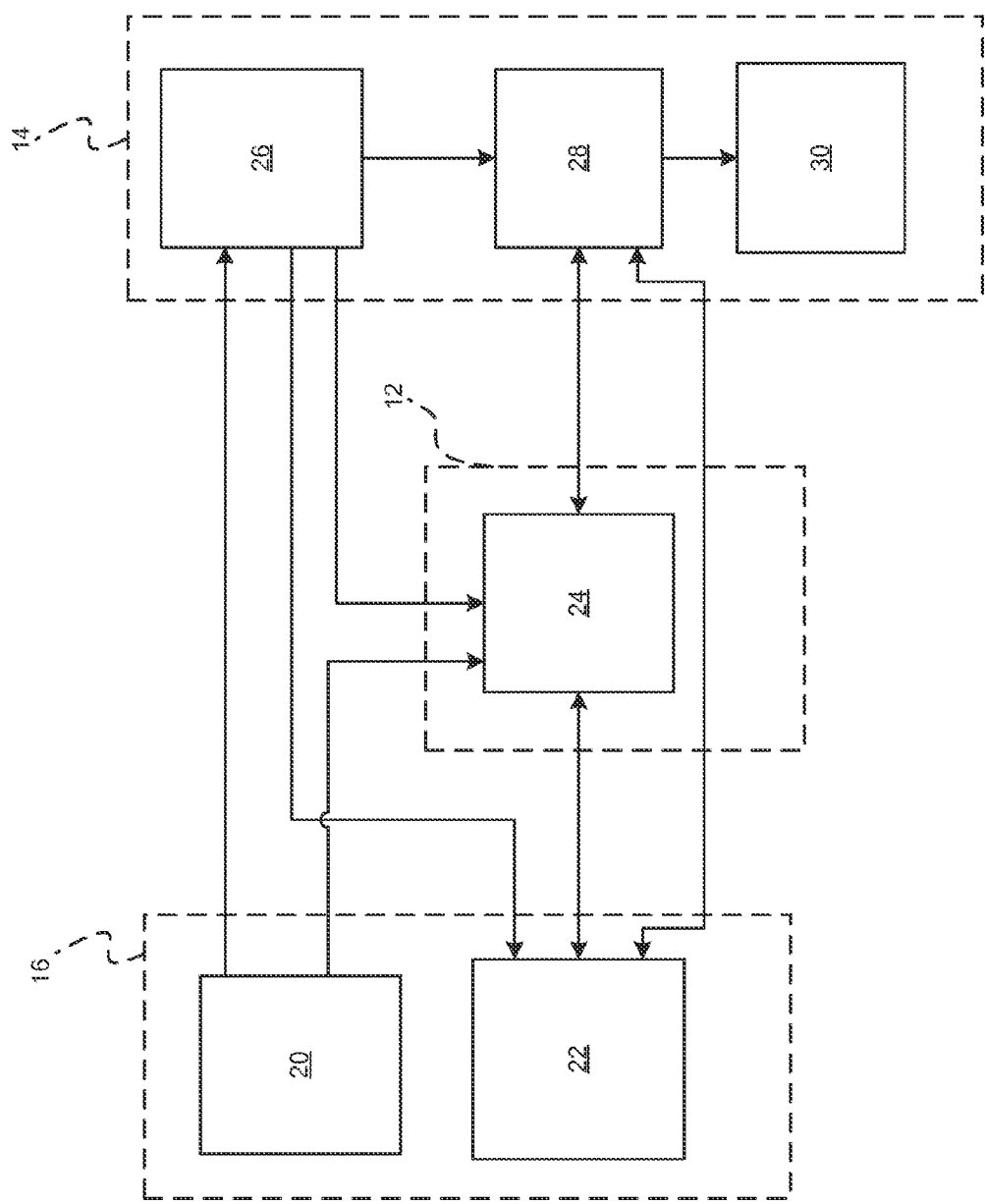
FIG. 2 is a functional block diagram illustrating functional modules of the communication system in accordance with various embodiments.
Figure 3:
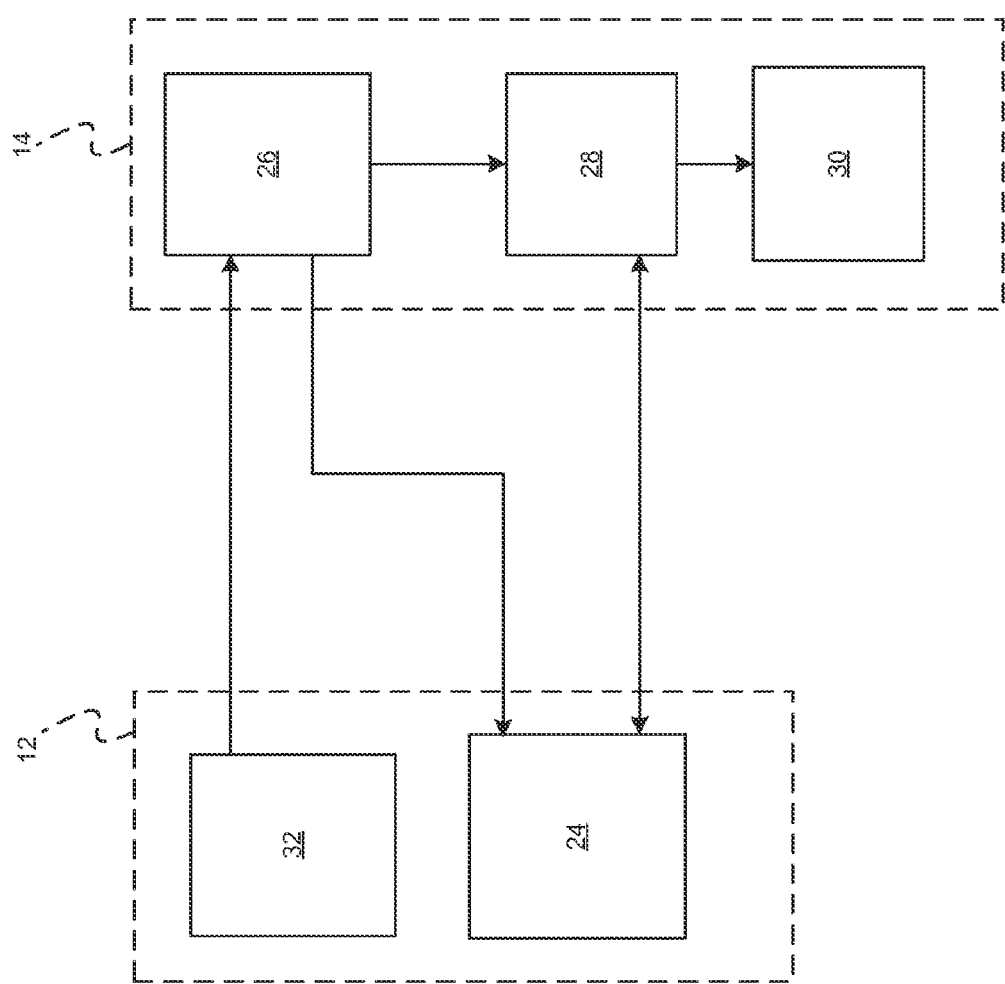
FIG. 3 is a functional block diagram illustrating functional modules of the communication system in accordance with various other embodiments.
Figure 4:
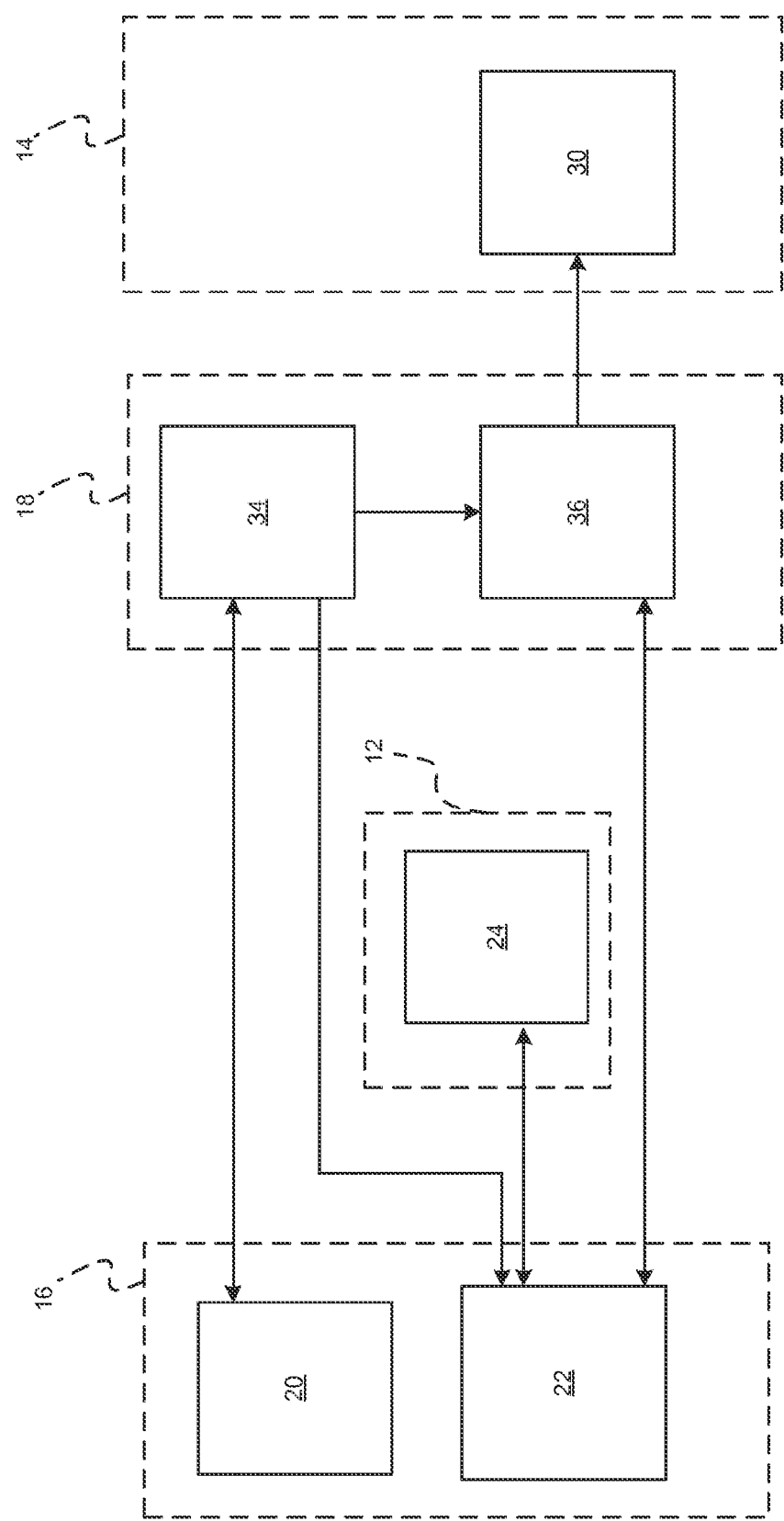
FIG. 4 is a functional block diagram illustrating functional modules of the communication system in accordance with various other embodiments.

Referring now to FIGS. 2-4, functional block diagrams illustrate various embodiments of the communication system 10. Various embodiments of communication systems 10 according to the present disclosure may include any number of sub-modules embedded within the vehicle 14, the WED 16, the OBT 12, and/or the remote server 18. As can be appreciated, the sub-modules shown in FIGS. 2-4 may be combined and/or further partitioned to similarly facilitate the secure communication.

With reference to FIG. 2, FIG. 2 illustrates embodiments where the OBT 12 facilitates secure communications between the WED 16 and the vehicle 14. For example, the WED 16 may include an application (i.e., a door unlock/lock application) that communicates with the vehicle 14 to perform a particular function (i.e., to lock or unlock the doors). In such embodiments, the WED 16 may include, but is not limited to, a connection request module 20, and a challenge request module 22; the OBT 12 may include, but is not limited to, a challenge request module 24; and the vehicle 14 may include, but is not limited to, a sequence manager module 26, a response verifier module 28, and a function control module 30.

As will be discussed in more detail with regard to FIGS. 5-17, the connection request module 20 of the WED 16 is configured to communicate a connection request or a message request to the vehicle 14 and/or the OBT 12. The challenge request module of the WED 16 is configured to receive challenge requests and/or responses from the vehicle 14 and/or the OBT 12, and to communicate challenge responses and/or requests to the vehicle 14 and/or the OBT 12. The challenge request module 24 of the OBT 12 is configured to store vehicle specific information, to verify vehicle specific information, to encrypt data from a vehicle 14 (i.e., a security key or shared key), and/or to communicate challenge response and/or requests to the vehicle 14 and/or the OBT 12.

The sequence manager module 26 of the vehicle 14 is configured to receive connection requests or message requests from the WED 16, to verify vehicle specific information, to generate data to be encrypted (i.e., the security key), to encrypt the data, and/or to communicate challenge requests to the OBT 12 and/or the WED 16. The response verifier module 28 of the vehicle 14 is configured to receive encrypted data from the OBT 12, and/or the WED 16, to receive the encrypted data from the sequence manager module 26, to verify the encrypted data from the OBT 12, the WED 16 and/or the vehicle 14, and to communicate challenge statuses to the OBT 12 and/or the WED 16. The function control module 30 of the vehicle 14 is configured to receive a function identifier from the response verifier module 28, and to perform a vehicle function based on the function identifier.

With reference now to FIG. 3, FIG. 3 illustrates embodiments where the OBT 12 facilitates secure communications between the OBT 12 and the vehicle 14. For example, the OBT 12 may include predefined message requests associated with the vehicle 14 (i.e., a door unlock/lock request)

that are communicated to the vehicle 14 when the OBT 12 is in a certain range of the vehicle 14. In such embodiments, the OBT 12 may include, but is not limited to, a connection request module 32 and the challenge request module 24; and the vehicle 14 may include, but is not limited to, the sequence manager module 26, the response verifier module 28, and the function control module 30.

As will be discussed in more detail with regard to FIGS. 19 and 20, the connection request module 32 of the OBT 12 is configured to communicate a connection request or a message request to the vehicle 14. The challenge request module 24 of the OBT 12 is configured to receive challenge requests and/or responses from the vehicle 14, to verify vehicle specific information, to encrypt data from the vehicle 14 (i.e., the security key), and/or to communicate challenge responses and/or requests to the vehicle 14.

The sequence manager module 26 of the vehicle 26 is configured to receive connection requests or message requests from the OBT 12, to verify vehicle specific information, to generate data to be encrypted (i.e., the security key), to encrypt the data, and/or to communicate challenge requests to the OBT 12. The response verifier module 28 of the vehicle 14 is configured to receive encrypted data from the OBT 12, to receive the encrypted data from the sequence manager module 26, to verify the encrypted data from the OBT 12, and to communicate challenge statuses to the OBT 12. The function control module 30 is configured to receive a function identifier from the response verifier module 28, and to perform a vehicle function based on the function identifier.

With reference now to FIG. 4, FIG. 4 illustrates embodiments where the OBT 12 facilitates secure communications between the WED 16 and the vehicle 14 via the remote server 18. For example, the WED 16 may include an application (i.e., a door unlock/lock application) that communicates with the remote server 18. The remote server 18, in turn, communicates a request to the vehicle 14 to perform a function requested by the application. In such embodiments, the WED 16 may include, but is not limited to, the connection request module 20, and the challenge request module 22; the OBT 12 may include, but is not limited to, the challenge request module 24; and the remote server 18 may include, but is not limited to, a sequence manager module 34, and a response verifier module 36; and the vehicle 14 may include, but is not limited to, the function control module 30.

As will be discussed in more detail with regard to FIGS. 21 and 22, the connection request module 20 of the WED 16 is configured to communicate a connection request or a message request to the remote server 18. The challenge request module 22 of the WED 16 is configured to receive challenge requests and/or responses from the remote server 18 and the OBT 12, and to communicate challenge responses and/or requests to the remote server 18 and the OBT 12. The challenge request module 24 of the OBT 12 is configured to receive vehicle specific information, to encrypt data from the vehicle 14 (i.e., the security key), and/or to communicate challenge response and/or requests to the OBT 12 and the remote server 18.

The sequence manager module 34 of the remote server 18 is configured to receive connection requests or message requests from the WED 16, to verify vehicle specific information, to generate data to be encrypted (i.e., the security key), to encrypt the data and/or to communicate challenge requests to the OBT 12 and/or the WED 16. The response verifier module 36 of the remote server 18 is configured to receive encrypted data from the WED 16, to receive the encrypted data from the sequence manager module 34, to verify the encrypted data from the WED 16, the WED 16 and/or the vehicle 14, and to communicate challenge statuses to the WED 16. The function control module 30 of the vehicle is configured to receive a function identifier from the response verifier module 36, and to perform a vehicle 14 function based on the function identifier.

Referring now to FIGS. 5-22, sequence diagrams illustrate communication methods that may be performed by the modules of the components of the various communication systems 10 in accordance with various embodiments. As shown in the sequence diagrams, the bolded arrows illustrate connected communications and the unbolded arrows illustrate connectionless communications. Such connected communications can be, for example, communications made directly between the devices and connectionless communications can be, for example, communications that are periodically or scheduled to be broadcast to any particular device.

As can be appreciated in light of the disclosure, the order of operation within the methods is not limited to the sequential execution as illustrated in FIGS. 5-22, but may be performed in one or more varying orders as applicable and in accordance with the present disclosure. As can further be appreciated, one or more steps of the methods may be added or removed without altering the spirit of the method.

Figure 5:
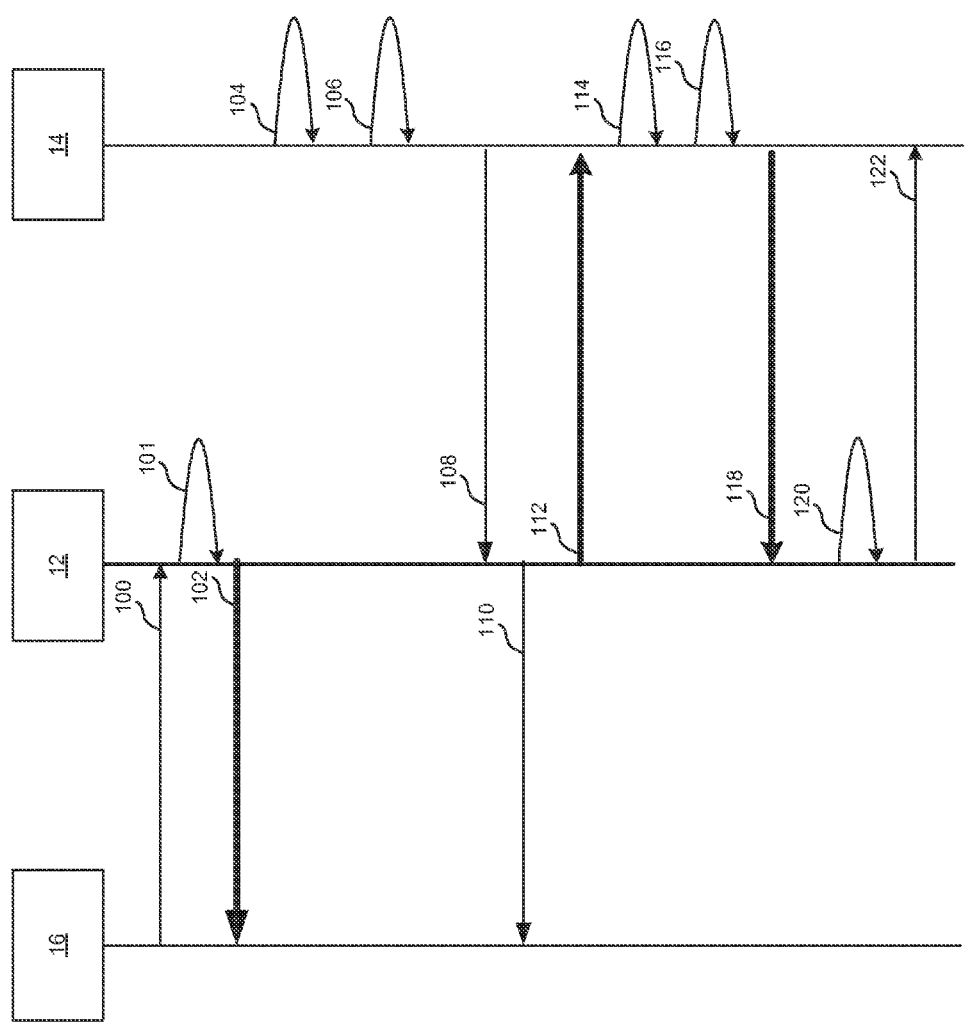
FIGS. 5-22 are sequence diagrams illustrating communication sequences of the communication system in accordance with various embodiments.
Figure 6:
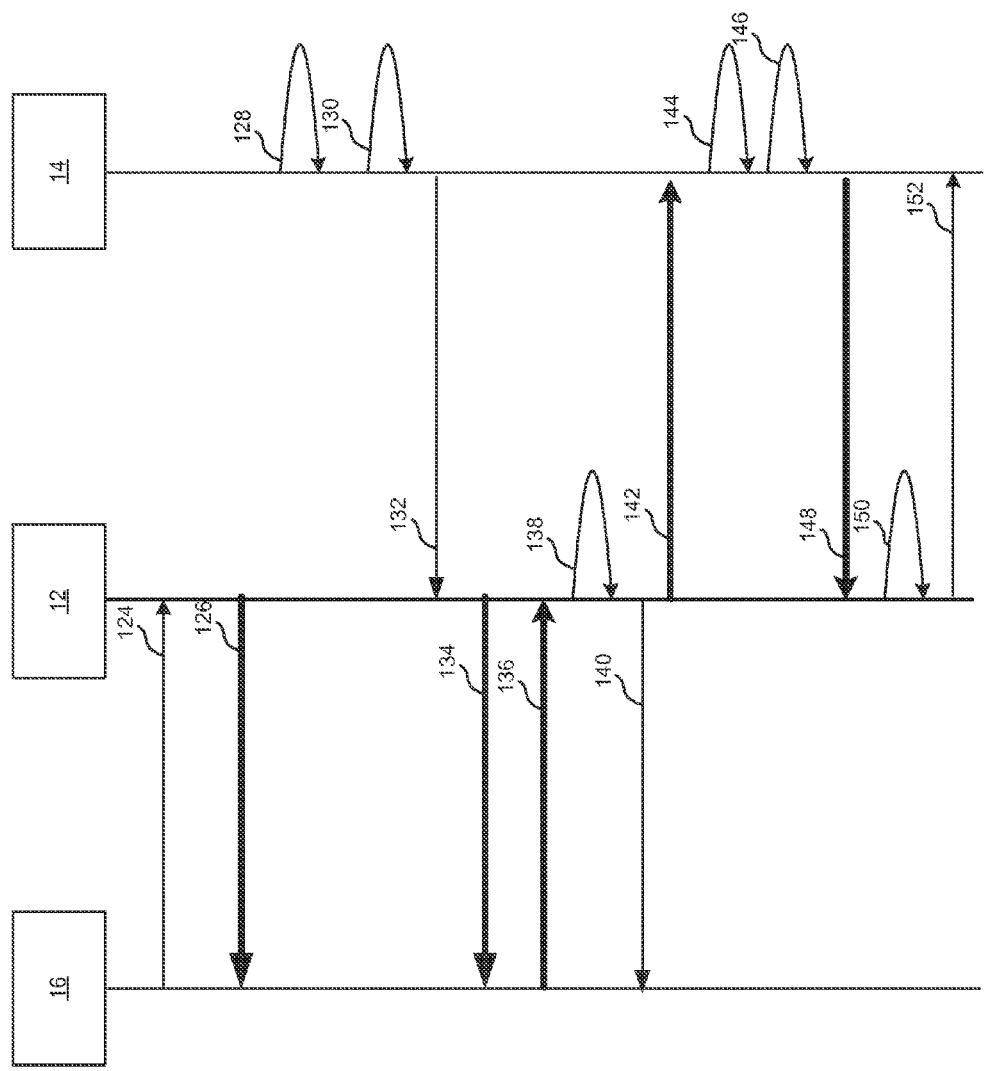

With reference to FIGS. 5 and 6, sequence diagrams illustrate exemplary sequences of steps of methods that may be performed by the various modules of FIG. 2, 3 or 4 to pair the OBT 12 with the vehicle 14 in a secure manner. In FIG. 5, the initial pairing of the OBT 12 without requiring the presence of the WED 16 in proximity of the vehicle 14. In FIG. 6, the initial pairing of the OBT 12 requires the presence of the WED 16 in proximity of the vehicle 14. As shown, the methods require an input from the vehicle 14 indicating that pairing is desired. Such input may be provided by a user interacting with a user interface (not shown) such as a pairing screen, or by a user interacting with a predefined switch or button (not shown) of the vehicle 14 dedicated for pairing. For exemplary purposes, the methods will be discussed in the context of a user interacting with a pairing screen.

As shown in FIG. 5, the initial pairing of the OBT 12 with the vehicle 14 may begin with the WED 16 generating a request to the OBT 12 to pair with the OBT 12 and connect to the vehicle 14 at 100. The request includes a unique identifier of the WED 16 (referred to hereinafter as the UID of the WED 16). The OBT 12 receives the request and stores the UID of the WED 16 at 101. The OBT 12 then generates a request confirmation and connects the OBT 12 to the WED 16 at 102.

At 104, once the vehicle 14 is placed in accessory mode and the pairing screen input is selected at 106, the vehicle 14 generates a request to the OBT 12 to pair with the OBT 12 at 108. Upon receipt of the request, the OBT 12 disconnects from the WED 16 at 110. The OBT 12 generates a confirmation to the vehicle 14 that includes an identifier of the OBT 12 (such as the MAC address or other address) at 112. The vehicle 14 stores the OBT 12 identifier and the UID of the WED 16 at 114, and generates a new secret key or retrieves a predefined secret key from memory at 116. The vehicle 14 sends the secret key along with the vehicle 14 identification number (VIN) to the OBT 12 at 118. The OBT 12 stores the secret key and the VIN at 120, and sends a confirmation to the vehicle 14 and disconnects from the vehicle 14 at 122.

In FIG. 6, the initial pairing process requires the presence of the WED 16 in proximity to the vehicle 14 by including an on-demand request for the UID of the WED 16. For example, the initial pairing of the OBT 12 with the vehicle 14 may begin with the WED 16 generating a request to pair and connect to the OBT 12 at 124. The OBT 12 then generates a request confirmation and connects the OBT 12 to the WED 16 at 126.

At 128, once the vehicle 14 is placed in accessory mode and the pairing screen input is selected at 130, the vehicle 14 generates a request to the OBT 12 to pair with the OBT 12 at 132. Upon receipt of the request, the OBT 12 requests the UID of the WED 16 at 134. The WED 16 responds with sending the UID at 136. The OBT 12 receives the UID and stores the UID for the WED 16 at 138. The OBT 12 disconnects from the WED 16 at 140. The OBT 12 generates a confirmation to the vehicle 14 that includes the OBT 12 address and the UID of the WED 16 at 142. The vehicle 14 stores the UID and the OBT 12 address at 144 and generates a new secret key or retrieves a predefined secret key from memory at 146. The vehicle 14 sends the secret key along with the vehicle 14 identification number (VIN) to the OBT 12 at 148. The OBT 12 stores the secret key and the VIN at 150, and sends a confirmation to the vehicle 14 and disconnects from the vehicle 14 at 152.

Figure 7:
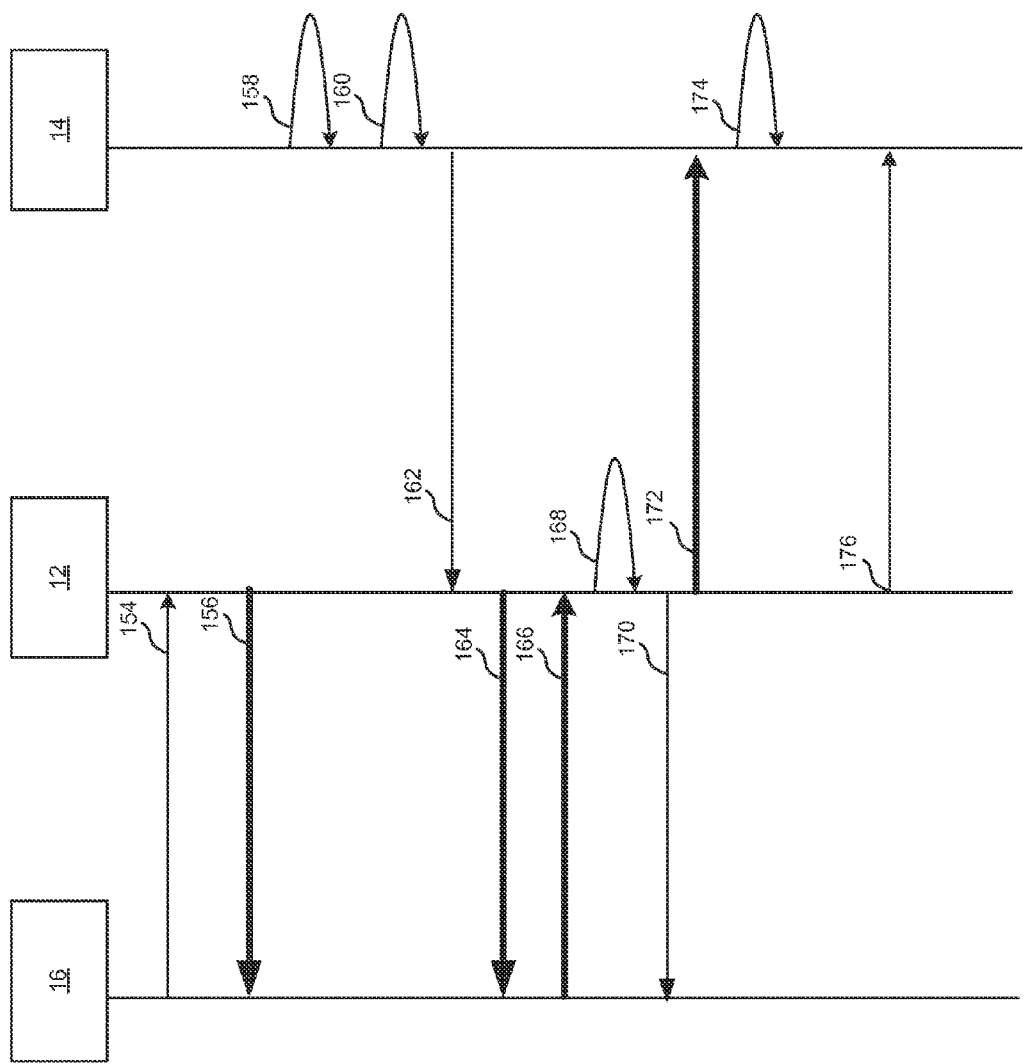

With reference to FIG. 7, a sequence diagram illustrates an exemplary sequence of steps that may be performed to pair the WED 16 with the vehicle 14 that requires the presence of the subsequent WED 16 in proximity to the vehicle 14. In FIG. 7, the initial pairing of the OBT 12 with the vehicle 14 may begin with the WED 16 generating a request to pair and connect to the OBT 12 at 154. The OBT 12 then generates a request confirmation and connects the OBT 12 to the WED 16 at 156.

At 158, once the vehicle 14 is placed in accessory mode and the pairing screen input is selected at 160, the vehicle 14 generates a request to the OBT 12 to pair with the OBT 12 at 162. Upon receipt of the request, the OBT 12 generates a request to the WED 16 for the UID of the WED 16 at 164. The WED 16 responds with sending the UID to the OBT 12 at 166. The OBT 12 receives the UID and stores the UID for the WED 16 at 168. The OBT 12 disconnects from the WED 16 at 170. The OBT 12 generates a confirmation to the vehicle 14 that includes the OBT 12 address and the UID of the WED 16 at 172. The vehicle 14 stores the UID and the OBT 12 address at 174. The OBT 12 disconnects from the vehicle 14 at 176.

Figure 8:
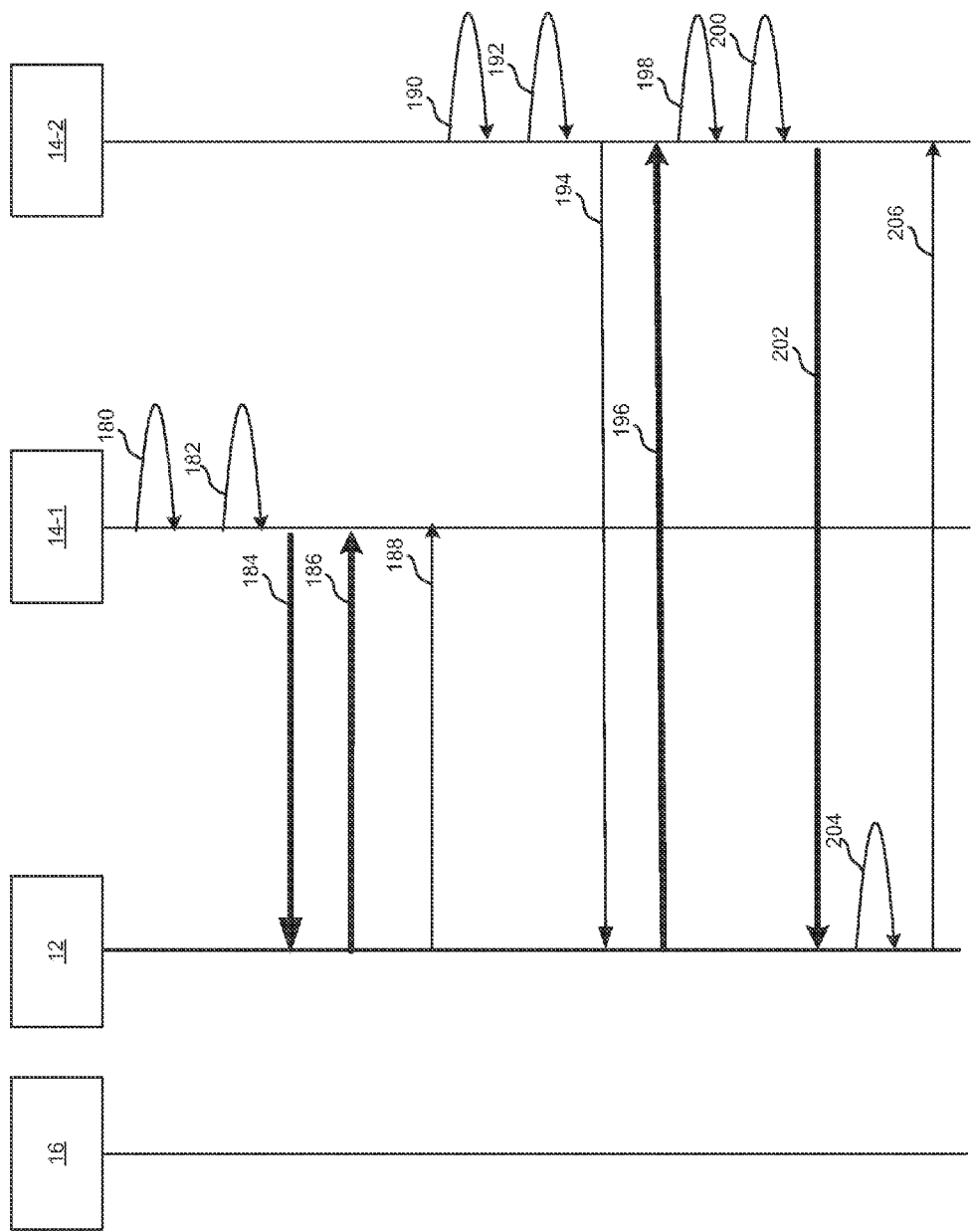

With reference to FIG. 8, a sequence diagram illustrates an exemplary sequence of steps that may be performed to pair the OBT 12 with multiple vehicles 14-1, 14-2. In FIG. 8, once a first vehicle 14-1 is placed in accessory mode at 180 and the pairing screen input is selected at 182, the first vehicle 14-1 generates an authorization message to the OBT 12 at 184. Upon receipt of the authorization, the OBT 12 generates a confirmation to the vehicle 14-1 that includes the OBT 12 address and the UID of the WED 16 at 186. The OBT 12 disconnects from the vehicle 14-1 at 188.

At 190, once a second vehicle 14-2 is placed in accessory mode and the pairing screen input is selected at 192, the vehicle 14-2 generates a request to the OBT 12 to pair with the OBT 12 at 194. The OBT 12 generates a confirmation to the vehicle 14-2 that includes the OBT address and the UID of the WED 16 at 196. The vehicle 14-2 stores the OBT address and the UID at 198 and generates a new secret key or retrieves a predefined secret key from memory at 200. The vehicle 14-2 sends the secret key along with the vehicle 14 identification number (VIN) to the OBT 12 at 202. The OBT 12 stores the secret key and the VIN at 204, and sends a confirmation to the vehicle 14 and disconnects from the vehicle 14 at 206.

Optionally, the pairing of the OBT 12 to the additional vehicle 14-2 can require the presence of the WED 16 in proximity to the vehicle 14. In this case, the steps of the method include steps shown in FIG. 6.

Figure 9:
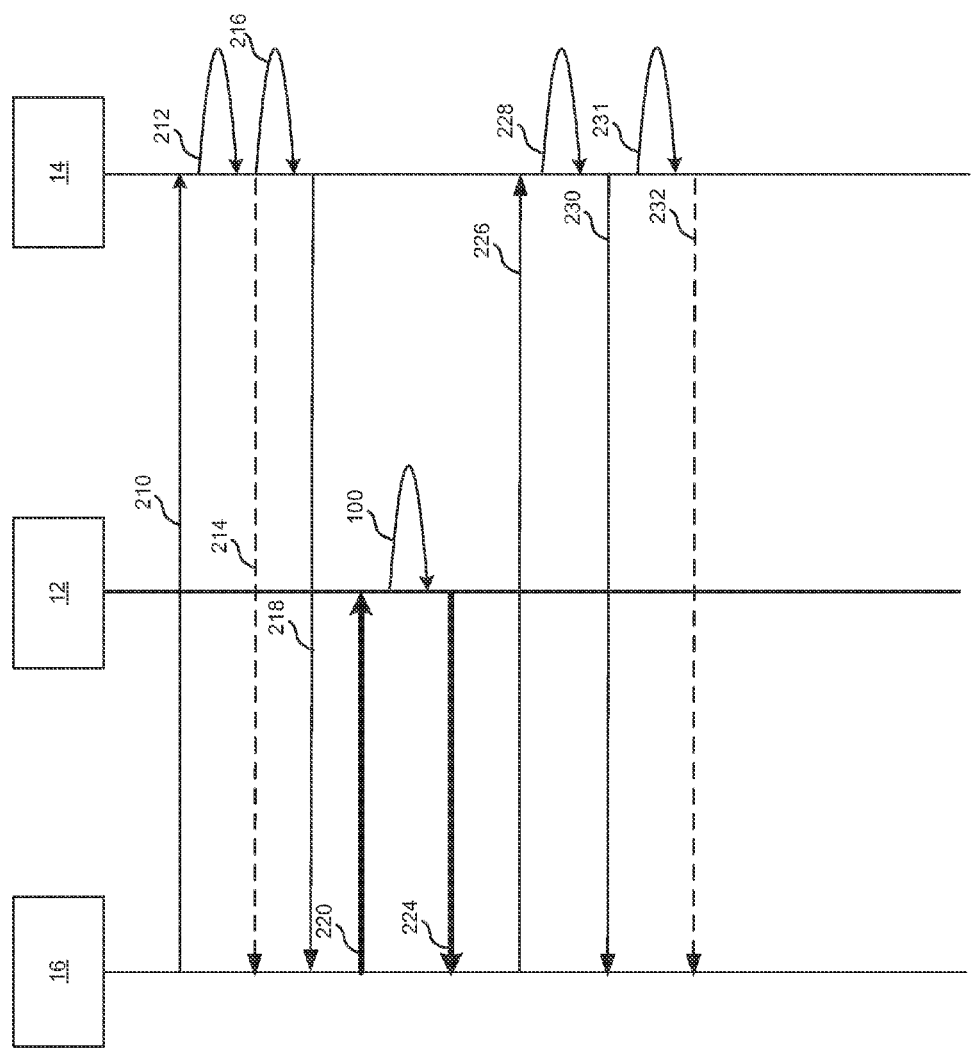
Figure 10:
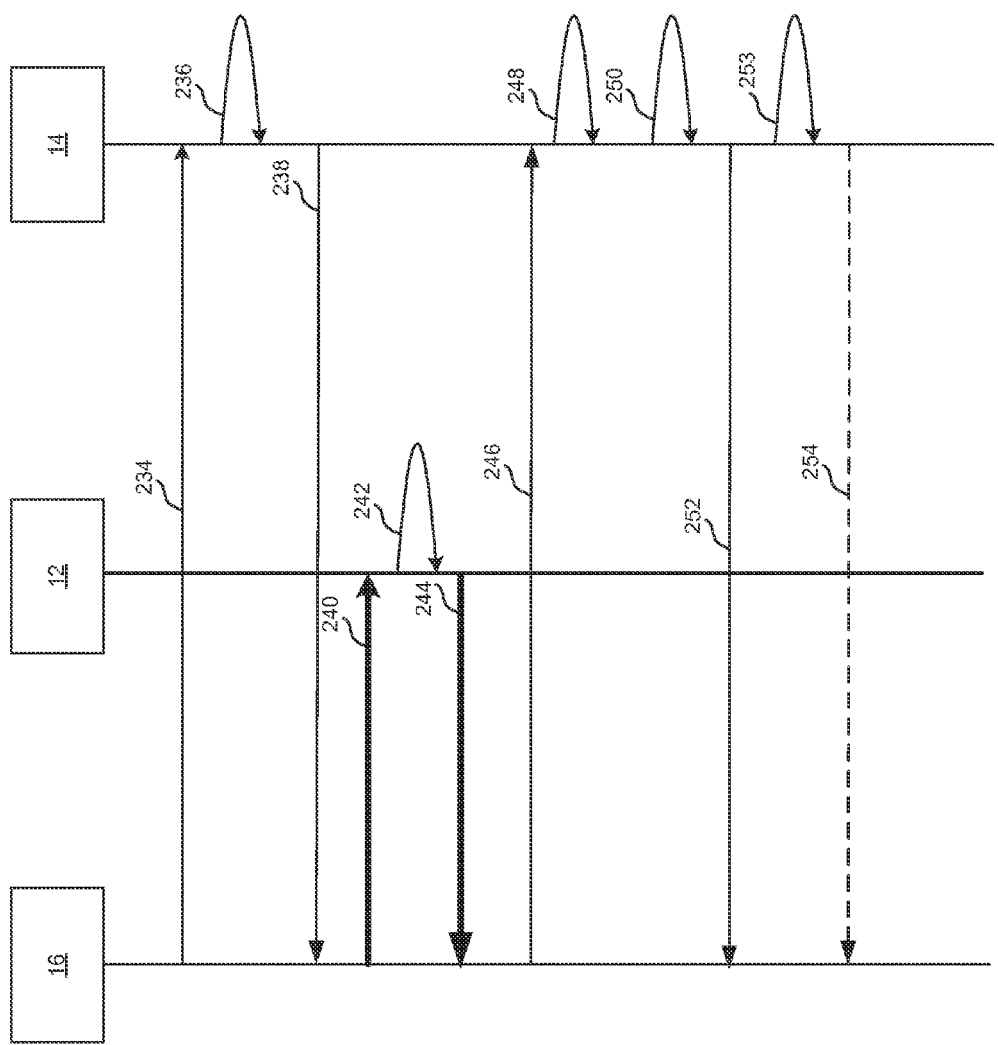

With reference to FIGS. 9 and 10, sequence diagrams illustrate exemplary sequences of steps that may be performed by the modules of FIG. 2 to authorize the WED 16 and to communicate messages between the WED 16 and the vehicle 14 once authorized in accordance with various embodiments. In FIG. 9, the connection request between the vehicle 14 and the WED 16 is authorized through direct communication between the OBT 12 and the WED 16 in a connected state. For example, the WED 16 generates a connection request to the vehicle 14 that includes the UID of the WED 16 at 210. The vehicle 14 verifies the UID at 212. If the UID is not a UID that has been paired with the vehicle 14, then the vehicle 14 generates a connection request fail status to the WED 16 at 214. If, however, the UID matches the UID of a WED 16 that has been paired with the vehicle 14, then the vehicle 14 encrypts a current sequence number at 216, and generates a challenge request to the WED 16 that includes the sequence number at 218. Upon receiving the challenge request, the WED 16 generates a challenge request including the sequence number to the OBT 12 at 220.

The OBT 12 receives the sequence number and encrypts the sequence number using the secret key stored during the pairing process at 222. The OBT 12 generates a challenge response including the encrypted sequence number to the WED 16 at 224. The WED 16, in turn, generates a challenge response including the encrypted sequence number to the vehicle 14 at 226.

Upon receipt of the encrypted sequence number, the vehicle 14 compares the received encrypted sequence number with the vehicle encrypted sequence number at 228. If the received encrypted sequence number matches the vehicle encrypted sequence number, then the vehicle 14 generates a challenge status indicating the WED 16 connection is authorized at 230. If, however, the received encrypted sequence number does not match the vehicle encrypted sequence number at 231, then the vehicle 14 generates a challenge status indicating the WED 16 connection has failed at 232 and the method may end.

In FIG. 10, the message request between the vehicle 14 and the WED 16 is authorized through direct communication between the OBT 12 and the WED 16 in a connected state. The WED 16 generates a message request to the vehicle 14 that includes an identifier of a function to be performed at 234. The vehicle 14 encrypts a current sequence number at 236, and generates a challenge request that includes the sequence number at 238. Upon receiving the challenge request, the WED 16 generates a challenge request including the sequence number to the OBT 12 at 240.

The OBT 12 receives the sequence number and encrypts the sequence number using the secret key stored during the pairing process at 242. The OBT 12 generates a challenge response including the encrypted sequence number to the WED 16 at 244. The WED 16, in turn, generates a challenge response including the encrypted sequence number to the vehicle 14 at 246.

Upon receipt of the encrypted sequence number, the vehicle 14 compares the received encrypted sequence number with the vehicle encrypted sequence number at 248. If the received encrypted sequence number matches the vehicle encrypted sequence number, then the function is performed by the vehicle 14 at 250, and the vehicle 14 generates a challenge status indicating the WED 16 message is authorized at 252. If, however, the received encrypted sequence number does not match the vehicle encrypted sequence number at 253, then the vehicle 14 generates a challenge status indicating the WED 16 message has failed at 254 and the method may end.

Figure 11:
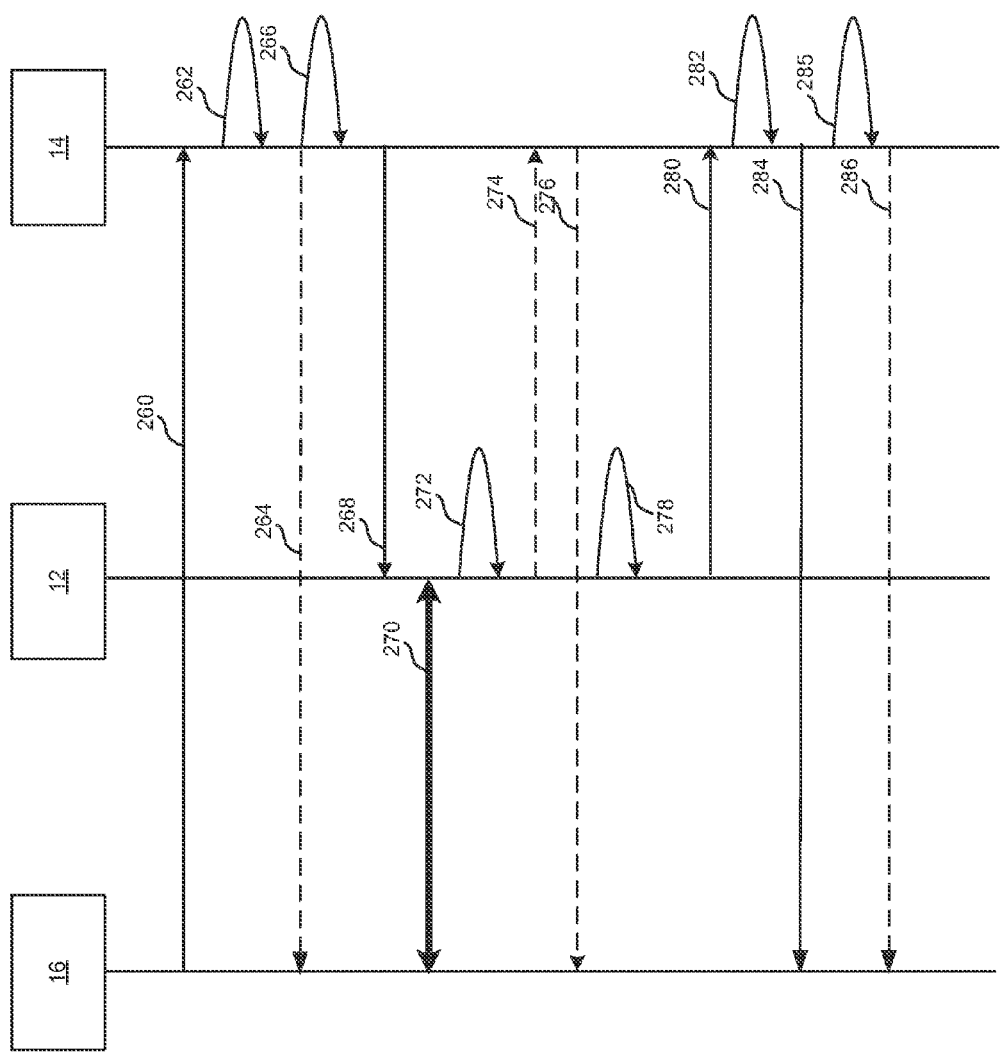
Figure 12:
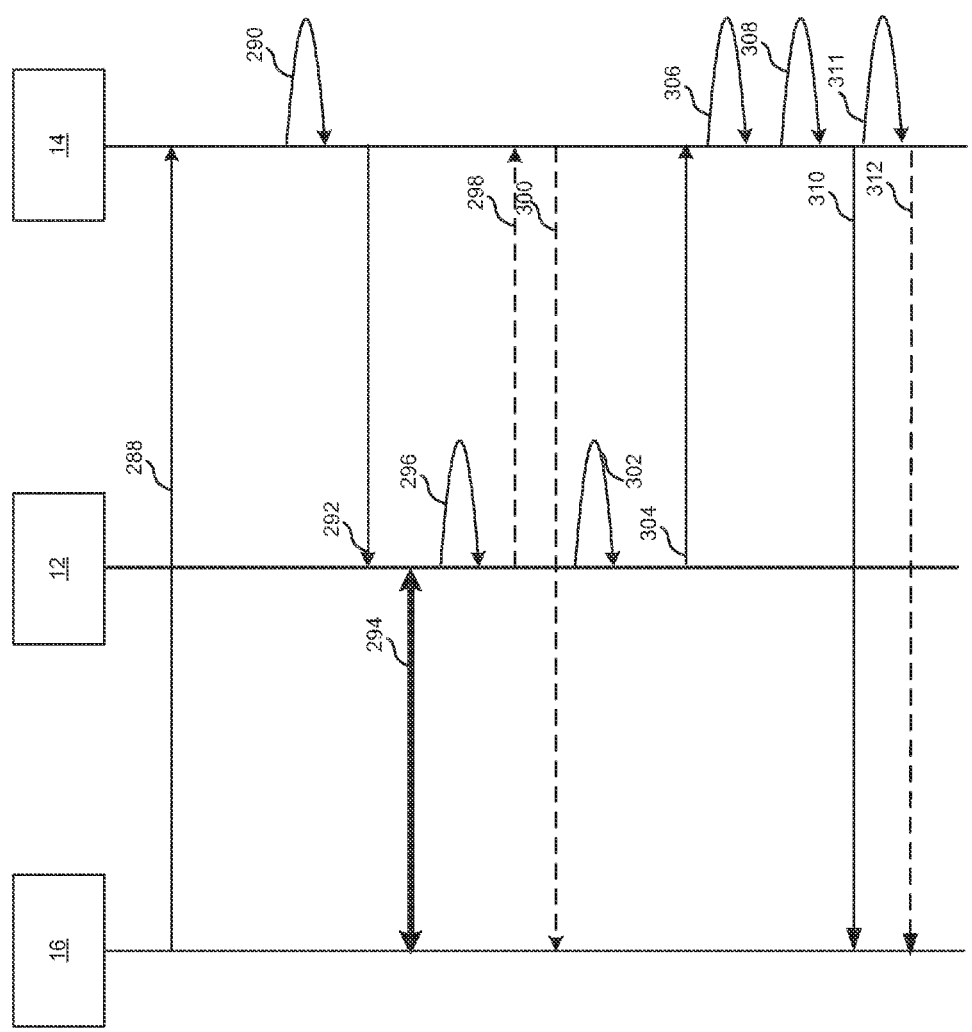

With reference to FIGS. 11 and 12, sequence diagrams illustrate exemplary sequences of steps that may be performed by the modules of FIG. 2 to authorize the WED 16 and to communicate messages between the WED 16 and the vehicle 14 once authorized in accordance with various other embodiments. In FIG. 11, the connection request between the vehicle 14 and the WED 16 is authorized through direct communication between the OBT 12 and the vehicle 14 in a connectionless state. For example, the WED 16 generates a connection request to the vehicle 14 that includes the UID of the WED 16 at 260. The vehicle 14 verifies the UID at 262. If the UID is not a UID that has been paired with the vehicle 14, then the vehicle 14 generates a connection request fail status to the WED 16 at 264, and the method ends. If, however, the UID matches the UID of a WED 16 that has been paired with the vehicle 14, then the vehicle 14 encrypts a current sequence number at 266, and generates a challenge request to the OBT 12 that includes the sequence number and the UID at 268. The OBT 12 and the WED 16 are then connected at 270.

Upon receiving the challenge request, the OBT 12 verifies the UID at 272. If the UID does not match a UID of a WED 16 that has been paired with the vehicle 14, then a challenge request is sent to the vehicle 14 indicating that the authorization has failed at 274, and the vehicle 14 generate a challenge status to the WED 16 indicating that the authorization has failed at 276 and the method may end. If, however, the UID matches a UID of a WED 16 that has been paired with the vehicle 14, the OBT 12 encrypts the sequence number using the secret key stored during the pairing process at 278. The OBT 12 generates a challenge response including the encrypted sequence number to the vehicle 14 at 280.

Upon receipt of the encrypted sequence number, the vehicle 14 compares the received encrypted sequence number with the vehicle encrypted sequence number at 282. If the received encrypted sequence number matches the vehicle encrypted sequence number, then the vehicle 14 generates a challenge status indicating the WED 16 connection is authorized at 284. If, however, the received encrypted sequence number does not match the vehicle encrypted sequence number at 285, then the vehicle 14 generates a challenge status indicating the WED 16 connection has failed at 286 and the method may end.

In FIG. 12, the message request between the vehicle 14 and the WED 16 is authorized through direct communication between the OBT 12 and the vehicle 14 in a connectionless state. For example, the WED 16 generates a message request to the vehicle 14 that includes a function identifier 288. The vehicle 14 encrypts a current sequence number at 290, and generates a challenge request to the OBT 12 that includes the sequence number at 292. The OBT 12 and the WED 16 are then connected at 294.

Upon receiving the challenge request, the OBT 12 encrypts the sequence number using the secret key stored during the pairing process at 302. The OBT 12 generates a challenge response including the encrypted sequence number to the vehicle 14 at 304.

Upon receipt of the encrypted sequence number, the vehicle 14 compares the received encrypted sequence number with the vehicle encrypted sequence number at 306. If the received encrypted sequence number matches the vehicle encrypted sequence number, then the vehicle 14 performs the function associated with the function identifier at 308, and generates a challenge status indicating the WED 16 message is authorized at 310. If, however, the received encrypted sequence number does not match the vehicle encrypted sequence number at 311, then the vehicle 14 generates a challenge status indicating the WED 16 message has failed at 312 and the method may end.

Figure 13:
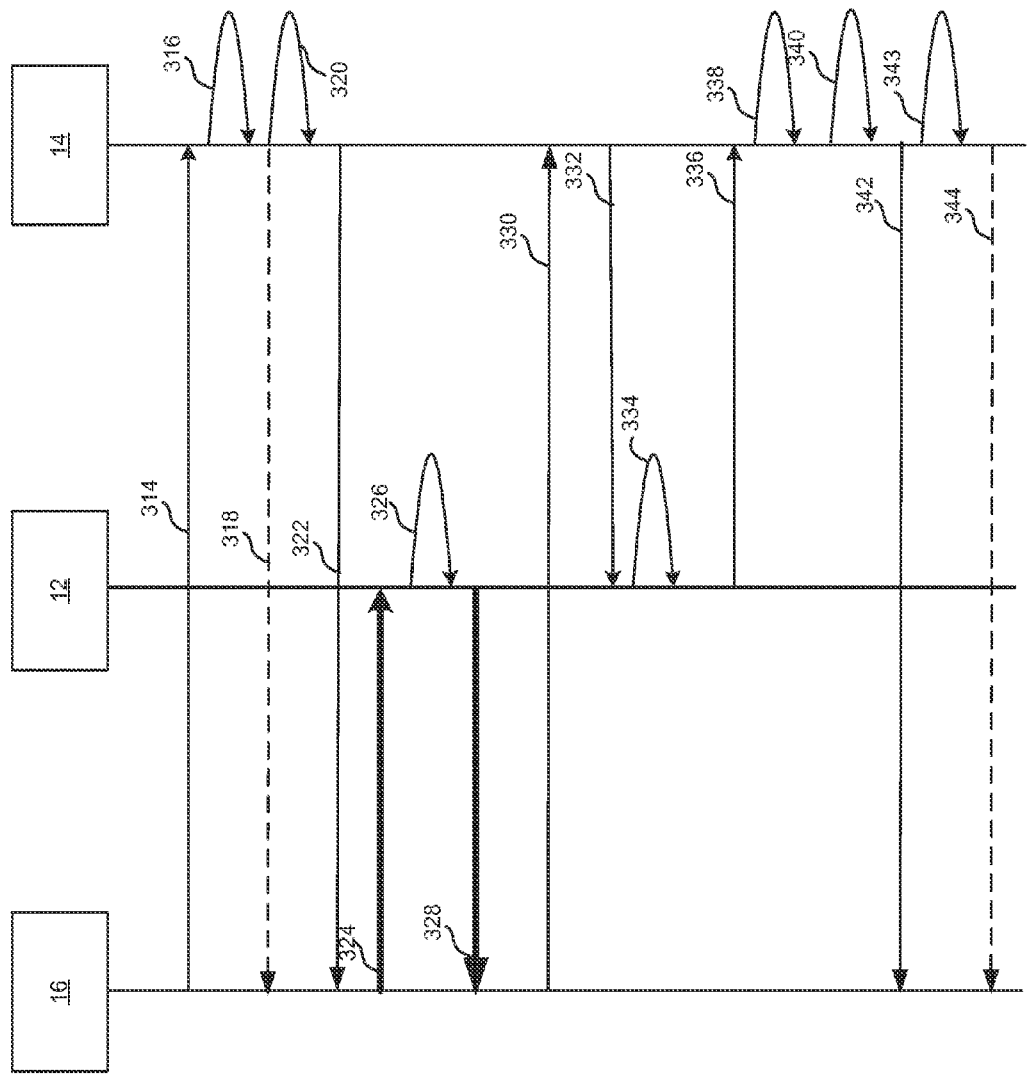
Figure 14:
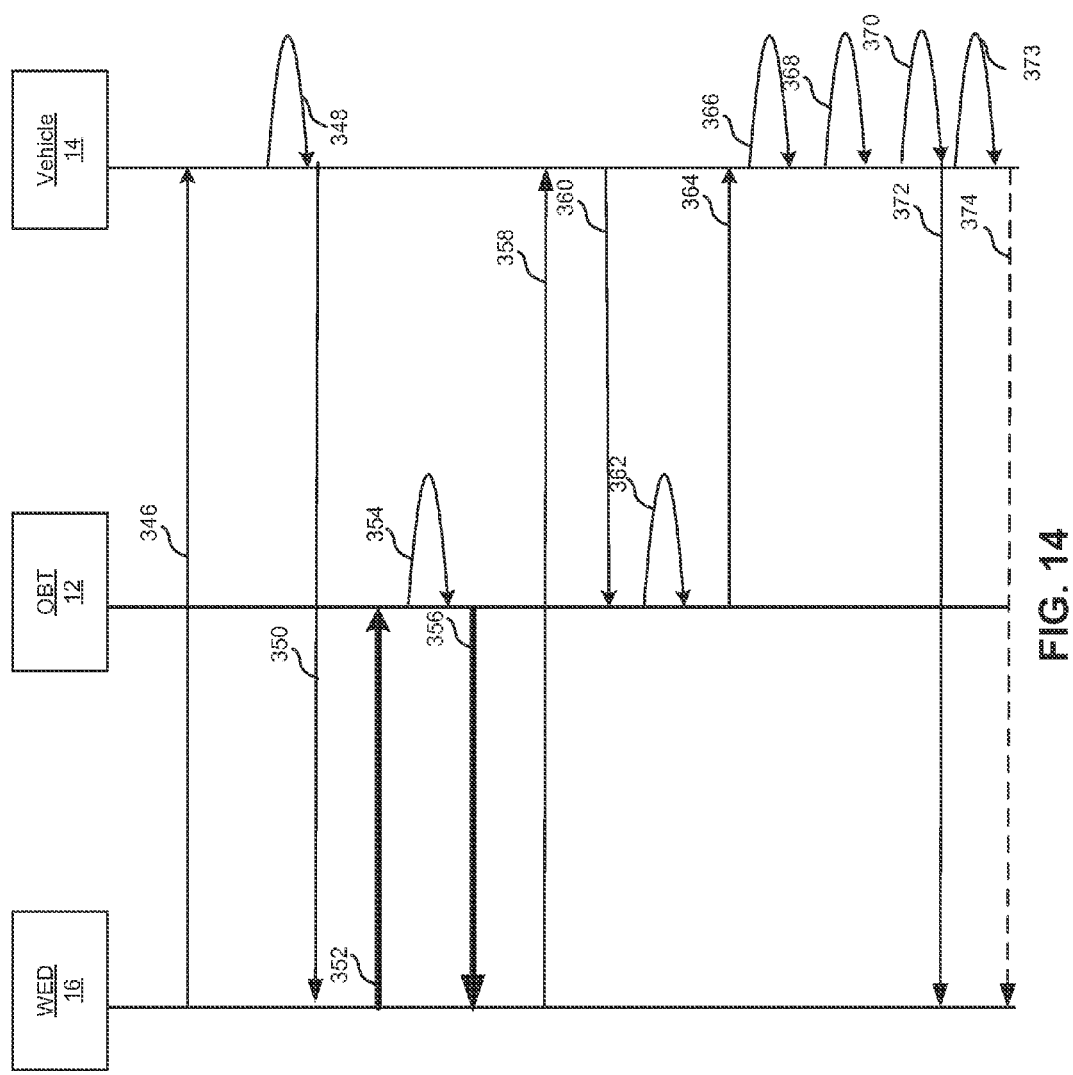

With reference to FIGS. 13 and 14, sequence diagrams illustrate exemplary sequences of steps that may be performed by the modules of FIG. 2 to authorize the WED 16 and to communicate messages between the WED 16 and the vehicle 14 once authorized in accordance with various other embodiments. In FIG. 13, the connection request between the vehicle 14 and the WED 16 is authorized through redundant authorization between the OBT 12 and the vehicle 14 in a connectionless state and between the OBT 12 and the WED 16 in a connected state. For example, the WED 16 generates a connection request to the vehicle 14 that includes the UID of the WED 16 at 314. The vehicle 14 verifies the UID at 316. If the UID is not a UID that has been paired with the vehicle 14 then the vehicle 14 generates a connection request fail status to the WED 16 at 318 and the method may end. If, however, the UID matches the UID of a WED 16 that has been paired with the vehicle 14, then the vehicle 14 encrypts a current sequence number at 320, and generates a challenge request to the WED 16 that includes the sequence number at 322. Upon receiving the challenge request, the WED 16 generates a challenge request including the sequence number to the OBT 12 at 324.

The OBT 12 receives the sequence number and encrypts the sequence number using the secret key stored during the pairing process at 326. The OBT 12 generates a challenge response including the encrypted sequence number to the WED 16 at 328. The WED 16, in turn, generates a challenge response including the encrypted sequence number to the vehicle 14 at 330.

Thereafter or substantially simultaneously, the vehicle 14 generates a challenge request to the OBT 12 that includes the sequence number at 332. Upon receiving the challenge request, the OBT 12 encrypts the sequence number using the secret key stored during the pairing process at 334. The OBT 12 generates a challenge response including the encrypted sequence number to the vehicle 14 at 336.

Upon receipt of the encrypted sequence number from the OBT 12, the vehicle 14 compares the received encrypted sequence number from the WED 16 with the received encrypted sequence number from the OBT 12 at 338. If the received encrypted sequence number from the WED 16 does not match the received encrypted sequence number from the OBT 12 at 343, then the vehicle 14 generates a challenge request to the WED 16 indicating that the authorization has failed at 344 and the method may end.

If, however, the received encrypted sequence number from the WED 16 matches the received encrypted sequence number from the OBT 12, then the vehicle 14 compares one of the encrypted sequence number from the WED 16 and the received encrypted sequence number from the OBT 12 with the vehicle encrypted sequence number at 340. If the received encrypted sequence number matches the vehicle encrypted sequence number, then the vehicle 14 generates a challenge status indicating the WED 16 authorized has passed at 342. If, however, the received encrypted sequence number does not match the vehicle encrypted sequence number, then the vehicle 14 generates a challenge status indicating the WED 16 authorization has failed at 344 and the method may end.

In FIG. 14, the message request between the vehicle 14 and the WED 16 is authorized through redundant authorization between the OBT 12 and the vehicle 14 in a connectionless state and between the OBT 12 and the WED 16 in a connected state. For example, the WED 16 generates a message request to the vehicle 14 that includes a function identifier at 346. The vehicle 14 encrypts a current sequence number at 348, and generates a challenge request to the WED 16 that includes the sequence number at 350. Upon receiving the challenge request, the WED 16 generates a challenge request including the sequence number to the OBT 12 at 352.

The OBT 12 receives the sequence number and encrypts the sequence number using the secret key stored during the pairing process at 354. The OBT 12 generates a challenge response including the encrypted sequence number to the WED 16 at 356. The WED 16, in turn, generates a challenge response including the encrypted sequence number to the vehicle 14 at 358.

Thereafter or substantially simultaneously, the vehicle 14 generates a challenge request to the OBT 12 that includes the sequence number at 360. Upon receiving the challenge request, the OBT 12 encrypts the sequence number using the secret key stored during the pairing process at 362. The OBT 12 generates a challenge response including the encrypted sequence number to the vehicle 14 at 364.

Upon receipt of the encrypted sequence number from the OBT 12, the vehicle 14 compares the received encrypted sequence number from the WED 16 with the received encrypted sequence number from the OBT 12 at 366. If the received encrypted sequence number from the WED 16 does not match the received encrypted sequence number from the OBT 12 at 373, then the vehicle 14 generates a challenge request to the WED 16 indicating that the authorization has failed at 374 and the method may end.

If, however, the received encrypted sequence number from the WED 16 matches the received encrypted sequence number from the OBT 12, then the vehicle 14 compares one of the encrypted sequence number from the WED 16 and the received encrypted sequence number from the OBT 12 with the vehicle encrypted sequence number at 368. If the received encrypted sequence number matches the vehicle encrypted sequence number, then the vehicle 14 performs the function associated with the function identifier at 370 and generates a challenge status indicating the WED 16 authorized has passed at 372. If, however, the received encrypted sequence number does not match the vehicle encrypted sequence number, then the vehicle 14 generates a challenge status indicating the WED 16 authorization has failed at 374 and the method may end.

Figure 15:
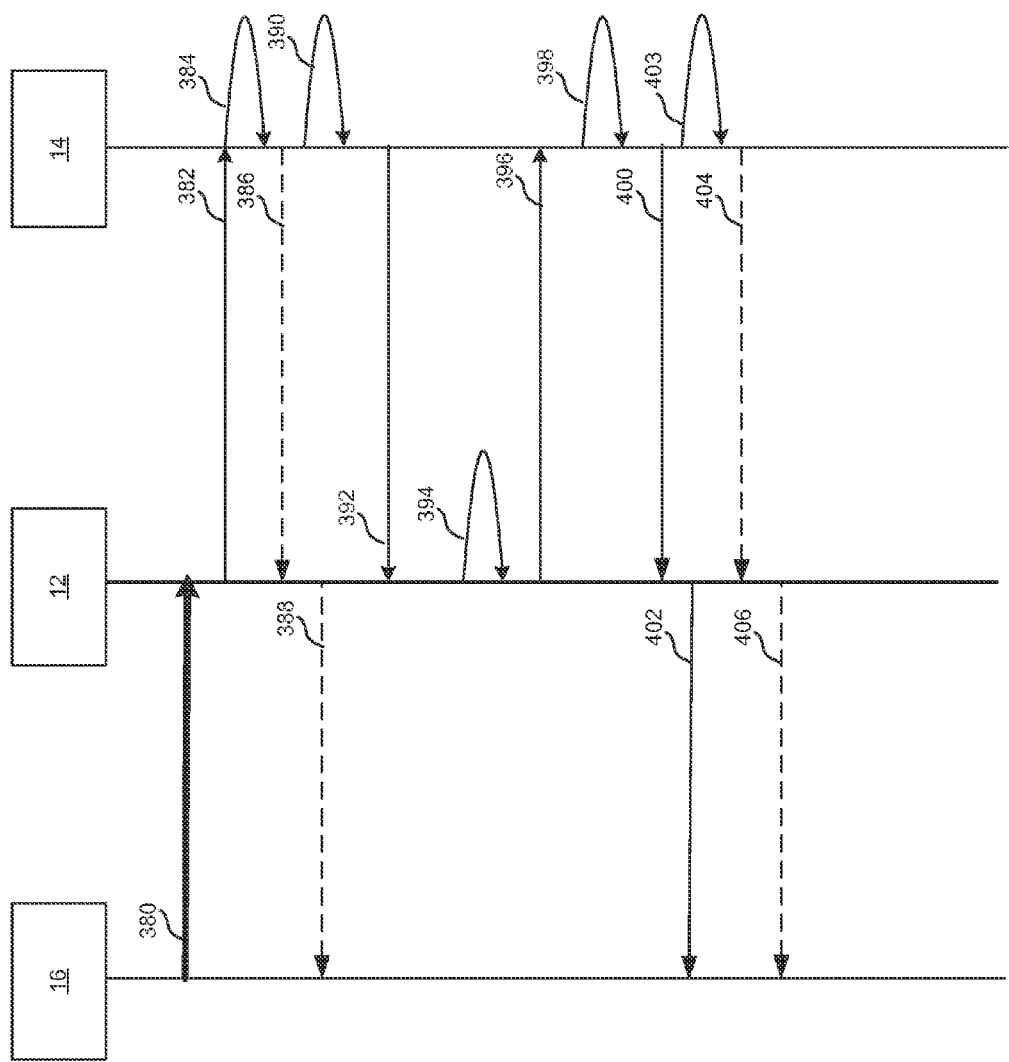
Figure 16:
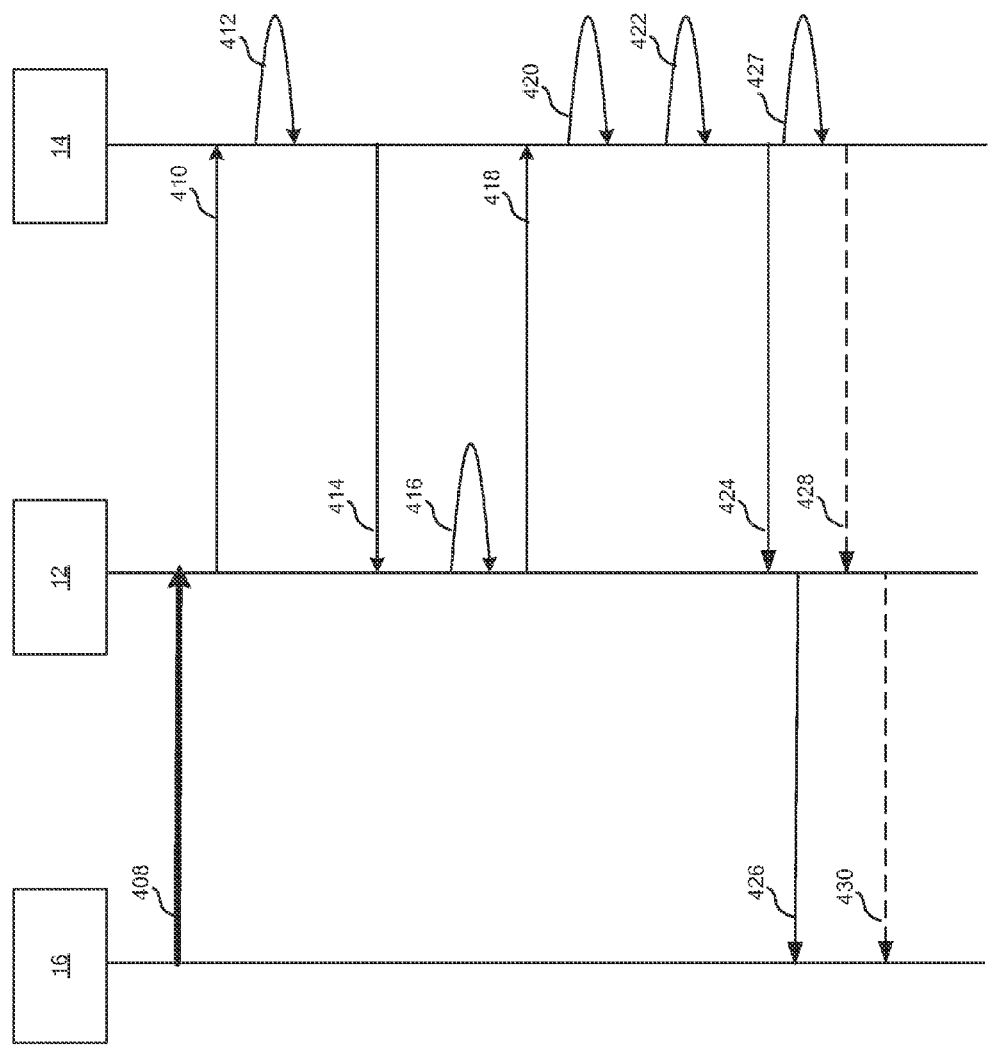

With reference to FIGS. 15 and 16, sequence diagrams illustrate exemplary sequences of steps that may be performed by the modules of FIG. 2 to authorize the WED 16 and to communicate messages between the WED 16 and the vehicle 14 once authorized in accordance with various other embodiments. In FIG. 15, the connection request between the vehicle 14 and the WED 16 is authorized through direct communication between the OBT 12 and the vehicle 14 with the challenge/response being in a connectionless state. For example, the WED 16 generates a connection request to the OBT 12 that includes the UID of the WED 16 at 380. The vehicle 14 generates a connection request to the vehicle 14 that includes the UID of the WED 16 at 382. The vehicle 14 verifies the UID at 384. If the UID is not a UID that has been paired with the vehicle 14, then the vehicle 14 generates a connection request fail status to the OBT 12 at 386. The OBT 12, in turn, generates a connection request fail status to the WED 16 at 288 and the method ends. If, however, the UID matches the UID of a WED 16 that has been paired with the vehicle 14, then the vehicle 14 encrypts a current sequence number at 390, and generates a challenge request to the OBT 12 that includes the sequence number at 392.

Upon receiving the challenge request, the OBT 12 encrypts the sequence number using the secret key stored during the pairing process at 394. The OBT 12 generates a challenge response including the encrypted sequence number to the vehicle 14 at 396.

Upon receipt of the encrypted sequence number, the vehicle 14 compares the received encrypted sequence number with the vehicle encrypted sequence number at 398. If the received encrypted sequence number matches the vehicle encrypted sequence number, then the vehicle 14 generates a challenge status to the OBT 12 indicating the WED 16 connection is authorized at 400. The OBT 12, in turn, generates a challenge status to the WED 16 indicating that the WED 16 connection is authorized at 402. If, however, the received encrypted sequence number does not match the vehicle encrypted sequence number at 403, then the vehicle 14 generates a challenge status to the OBT 12 indicating the WED 16 connection has failed at 404. The OBT 12, in turn, generates a challenge status to the WED 16 indicating that the WED 16 connection has failed at 406 and the method may end.

In FIG. 16, the message request between the vehicle 14 and the WED 16 is authorized through direct communication between the OBT 12 and the vehicle 14 with the challenge/response being in a connectionless state. For example, the WED 16 generates a message request to the OBT 12 that includes a function identifier 408. The OBT 12, in turn, generates a message request to the vehicle 14 that includes the function identifier at 410. The vehicle 14 encrypts a current sequence number at 412 and generates a challenge request to the OBT 12 that includes the sequence number at 414.

Upon receiving the challenge request, the OBT 12 encrypts the sequence number using the secret key stored during the pairing process at 416. The OBT 12 generates a challenge response including the encrypted sequence number to the vehicle 14 at 418.

Upon receipt of the encrypted sequence number, the vehicle 14 compares the received encrypted sequence number with the vehicle encrypted sequence number at 420. If the received encrypted sequence number matches the vehicle encrypted sequence number, then the vehicle 14 performs the function associated with the function identifier at 422, and generates a challenge status to the OBT 12 indicating the WED 16 message is authorized at 424. The OBT 12, in turn, generates a challenge status to the WED 16 indicating that the WED 16 message is authorized at 426. If, however, the received encrypted sequence number does not match the vehicle encrypted sequence number at 427, then the vehicle 14 generates a challenge status to the OBT 12 indicating the WED 16 message has failed at 428. The OBT 12, in turn, generates a challenge status to the WED 16 indicating the WED 16 message has failed at 430 and the method may end.

Figure 17:
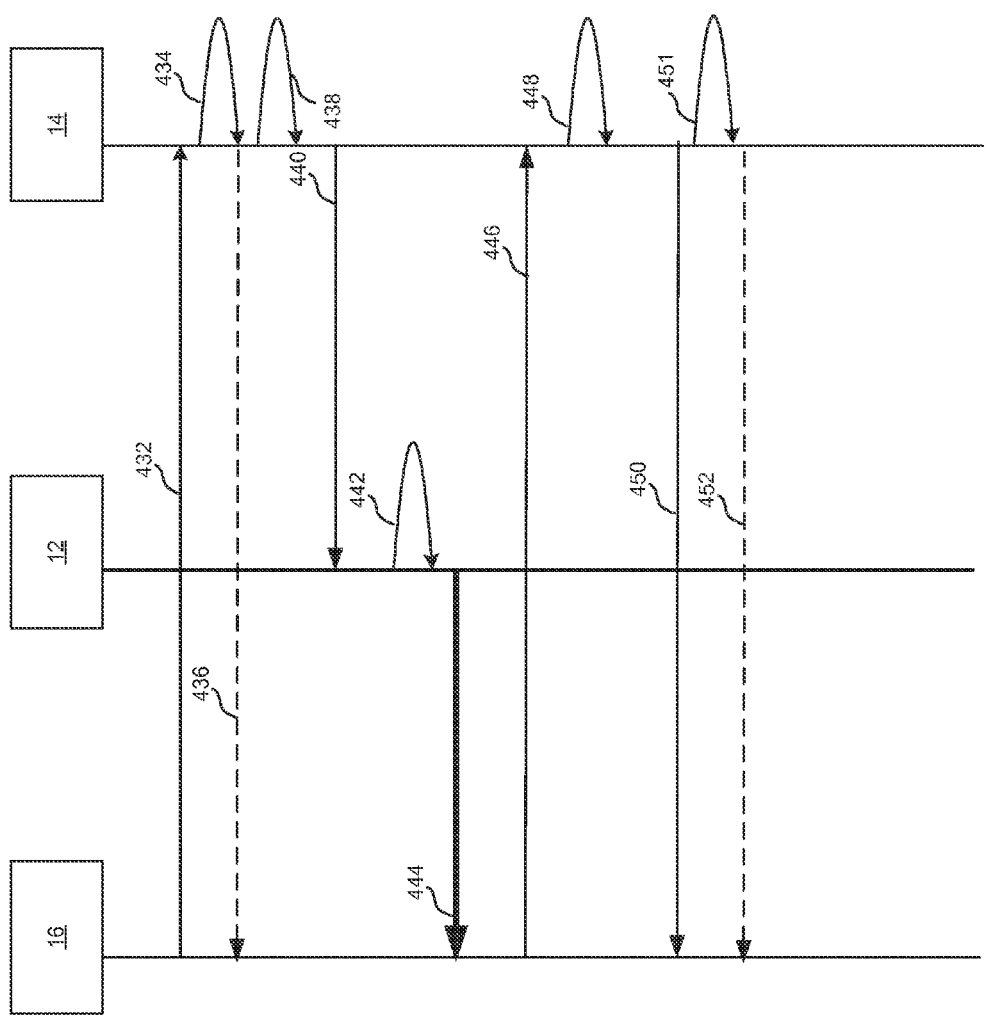
Figure 18:
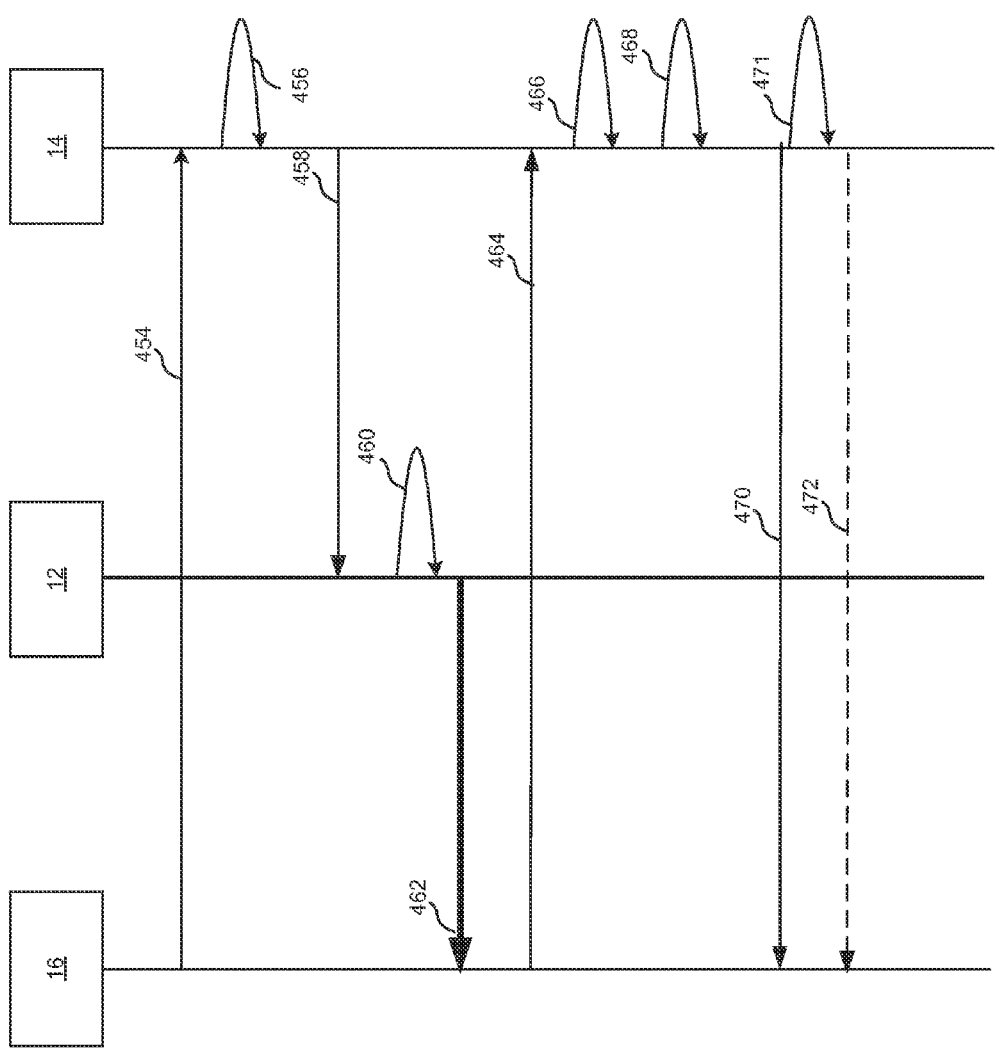

With reference to FIGS. 17 and 18, sequence diagrams illustrate exemplary sequences of steps that may be performed by the modules of FIG. 2 to authorize the WED 16 and to communicate messages between the WED 16 and the vehicle 14 once authorized in accordance with various other embodiments. In FIG. 17, the connection request for a stand-alone OBT 12 is through a vehicle 14 to OBT 12 challenge request, between the OBT 12 and the WED 16 using a challenge request, and between the vehicle 14 and the WED 16 using the comparison. For example, the WED 16 generates a connection request to the vehicle 14 that includes the UID of the WED 16 at 432. The vehicle 14 verifies the UID at 434. If the UID is not a UID that has been paired with the vehicle 14, then the vehicle 14 generates a connection request fail status to the WED 16 at 436 and the method ends. If, however, the UID matches the UID of a WED 16 that has been paired with the vehicle 14, then the vehicle 14 encrypts a current sequence number at 438, and generates a challenge request to the OBT 12 that includes the sequence number at 440.

The OBT 12 encrypts the sequence number using the secret key stored during the pairing process at 442. The OBT 12 generates a challenge response including the encrypted sequence number to the WED 16 at 444. The WED 16, in turn, generates a challenge response to the vehicle 14 including the encrypted sequence number at 446.

Upon receipt of the encrypted sequence number, the vehicle 14 compares the received encrypted sequence number with the vehicle encrypted sequence number at 448. If the received encrypted sequence number matches the vehicle encrypted sequence number, then the vehicle 14 generates a challenge status indicating the WED 16 connection is authorized at 450. If, however, the received encrypted sequence number does not match the vehicle encrypted sequence number at 451, then the vehicle 14 generates a challenge status indicating the WED 16 connection has failed at 452 and the method ends.

In FIG. 18, the message request for a stand-alone OBT 12 through a vehicle 14 to OBT 12 challenge request, between the OBT 12 and the WED 16 using a challenge request and between the vehicle 14 and the WED 16 using the comparison. For example, the WED 16 generates a message request to the vehicle 14 that includes a function identifier at 454. The vehicle 14 encrypts a current sequence number at 456 and generates a challenge request to the OBT 12 that includes the sequence number at 458.

Upon receiving the challenge request, the OBT 12 encrypts the sequence number using the secret key stored during the pairing process at 460. The OBT 12 generates a challenge response including the encrypted sequence number to the WED 16 at 462. The WED 16, in turn, generates a challenge response to the vehicle 14 including the encrypted sequence number at 464.

Upon receipt of the encrypted sequence number, the vehicle 14 compares the received encrypted sequence number with the vehicle encrypted sequence number at 466. If the received encrypted sequence number matches the vehicle encrypted sequence number, then the vehicle 14 performs the function associated with the function identifier at 468 and generates a challenge status indicating the WED 16 message is authorized at 470. If, however, the received encrypted sequence number does not match the vehicle encrypted sequence number at 471, then the vehicle 14 generates a challenge status indicating the WED 16 message has failed at 472 and the method may end.

Figure 19:
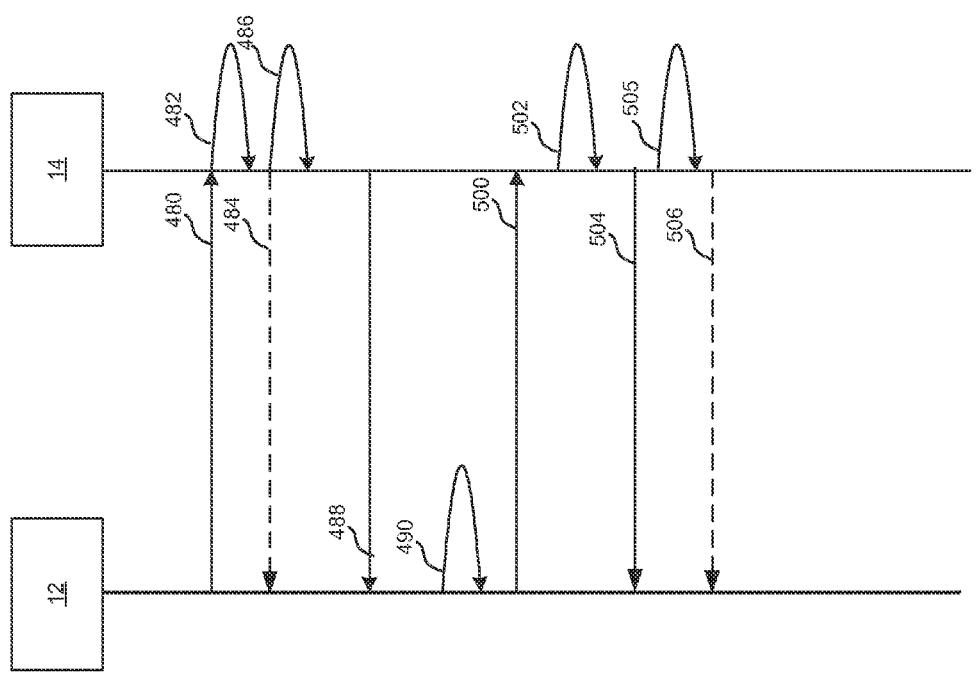
Figure 20:
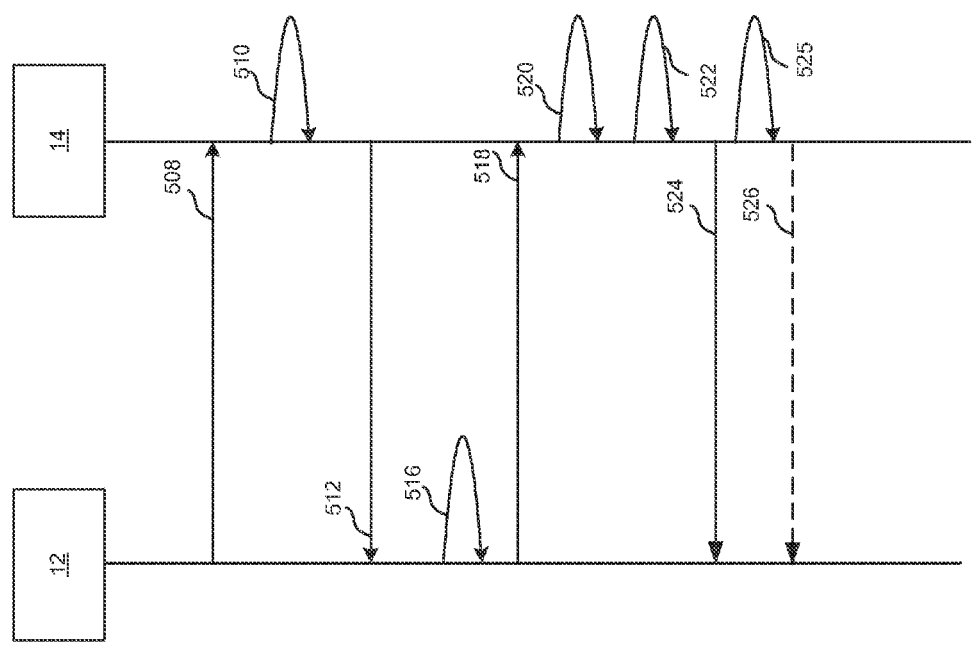

With reference to FIGS. 19 and 20, sequence diagrams illustrate exemplary sequences of steps that may be performed by the modules of FIG. 3 to authorize the OBT 12 and to communicate messages between the OBT 12 and the vehicle 14 once authorized in accordance with various other embodiments. In FIG. 19, the connection request between the vehicle 14 and a stand-alone OBT 12 is authorized through direct communication between the OBT 12 and the vehicle 14 in a connectionless state. For example, the OBT 12 generates a connection request to the OBT 12 that includes the UID of the OBT 12 at 480. The vehicle 14 verifies the UID at 482. If the UID is not a UID that has been paired with the vehicle 14, then the vehicle 14 generates a connection request fail status to the OBT 12 at 484 and the method ends. If, however, the UID matches the UID of an OBT 12 that has been paired with the vehicle 14, then the vehicle 14 encrypts a current sequence number at 486, and generates a challenge request to the OBT 12 that includes the sequence number at 488.

Upon receiving the challenge request, the OBT 12 encrypts the sequence number using the encryption key stored during the pairing process at 490. The OBT 12 generates a challenge response including the encrypted sequence number to the vehicle 14 at 500.

Upon receipt of the encrypted sequence number, the vehicle 14 compares the received encrypted sequence number with the vehicle encrypted sequence number at 502. If the received encrypted sequence number matches the vehicle encrypted sequence number, then the vehicle 14 generates a challenge status to the OBT 12 indicating the OBT 12 connection is authorized at 504. If, however, the received encrypted sequence number does not match the vehicle encrypted sequence number at 505, then the vehicle 14 generates a challenge status to the OBT 12 indicating the OBT 12 connection has failed at 506 and the method may end.

In FIG. 20, the message request between the vehicle 14 and a stand-alone OBT 12 is authorized through direct communication between the OBT 12 and the vehicle 14 in a connectionless state. For example, the OBT 12 generates a message request to the vehicle 14 that includes the function identifier at 508. The vehicle 14 encrypts a current sequence number at 510, and generates a challenge request to the OBT 12 that includes the sequence number at 512.

Upon receiving the challenge request, the OBT 12 encrypts the sequence number using the secret key stored during the pairing process at 516. The OBT 12 generates a challenge response including the encrypted sequence number to the vehicle 14 at 518.

Upon receipt of the encrypted sequence number, the vehicle 14 compares the received encrypted sequence number with the vehicle encrypted sequence number at 520. If the received encrypted sequence number matches the vehicle encrypted sequence number, then the vehicle 14 performs the function associated with the function identifier at 522 and generates a challenge status to the OBT 12 indicating the OBT 12 message is authorized at 524. If, however, the received encrypted sequence number does not match the vehicle encrypted sequence number at 525, then the vehicle 14 generates a challenge status to the OBT 12 indicating the OBT 12 message has failed at 526 and the method may end.

Figure 21:
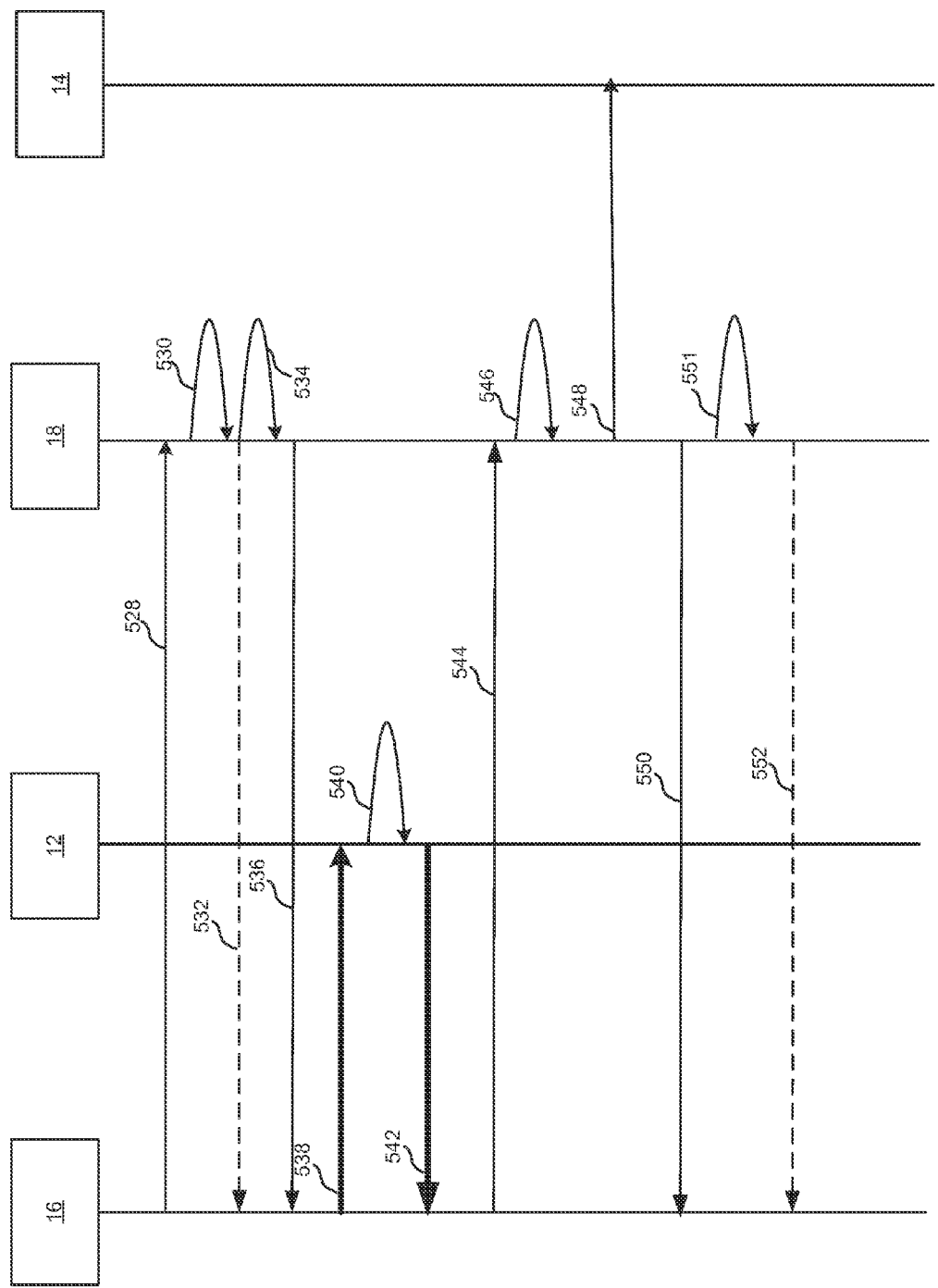
Figure 22:
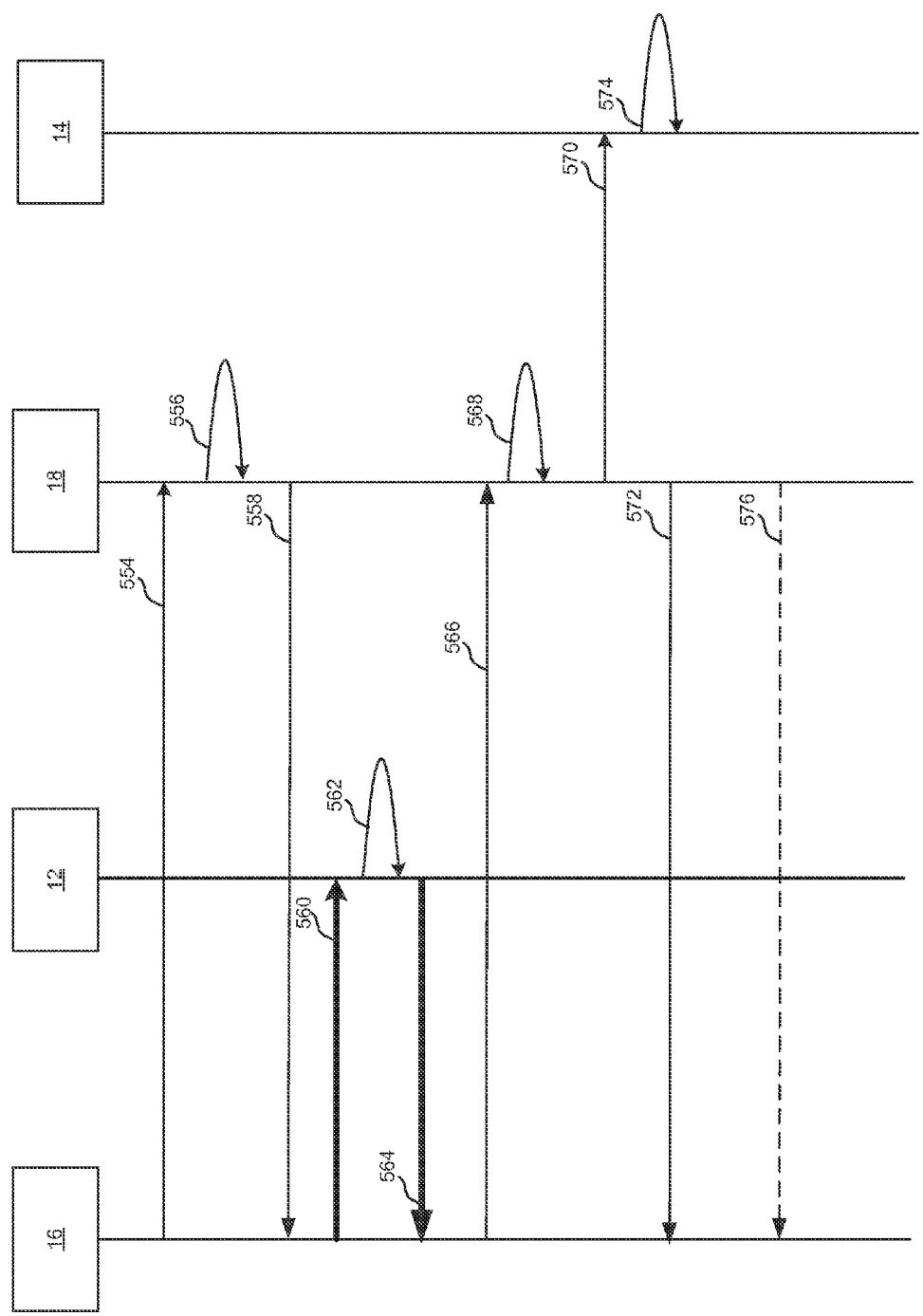

With reference to FIGS. 21 and 22, sequence diagrams illustrate exemplary sequences of steps that may be performed by the modules of FIG. 4 to authorize the WED 16 and to communicate messages between the WED 16 and the vehicle 14 once authorized via the remote server 18 in accordance with various other embodiments. In FIG. 21, the connection request between the vehicle 14 and the remote server 18 is authorized through direct communication between the OBT 12 and the vehicle 14 with the challenge/ response being in a connected state. For example, the WED 16 generates a connection request to the remote server 18 that includes the UID of the WED 16 at 528. The remote server 18 verifies the UID, the address of the OBT 12, and/or the vehicle information at 530. If the UID is not a UID that has been paired with the vehicle 14 or the OBT 12 is not an OBT 12 that has been paired with the vehicle 14, then the remote server 18 generates a connection request fail status to the WED 16 at 532 and the method ends. If, however, the UID matches the UID of a WED 16 that has been paired with the vehicle 14 and the OBT 12 is an OBT that has been paired with the vehicle 14, then the remote server 18 encrypts a current sequence number at 534, and generates a challenge request to the WED 16 that includes the sequence number at 536.

The WED 16, in turn, relays the challenge request from the remote server 18 to the OBT 12 that includes the sequence number at 538. The OBT 12 encrypts the sequence number using the secret key stored during the pairing process at 540. The OBT 12 generates a challenge response including the encrypted sequence number and vehicle identification number to the WED 16 at 542. The WED 16, in turn, relays the challenge response from the WED 16 to the remote server 18 that includes the encrypted sequence number and the vehicle identification number at 544.

Upon receipt of the encrypted sequence number and the vehicle identification number, the remote server 18 compares the vehicle identification number with a server stored vehicle identification number and compares the received encrypted sequence number with the server encrypted sequence number at 546. If the received vehicle identification number and the received encrypted sequence number matches the server vehicle identification number and the encrypted sequence number respectively, then the remote server 18 generates a message request to the vehicle 14 that includes an authorization message to the vehicle 14 at 548 and generates a challenge status to the WED 16 indicating the WED 16 connection is authorized at 550. If, however, at least one of the received vehicle identification number and the received encrypted sequence number do not match the server vehicle identification number and the server encrypted sequence number respectively at 551, then the remote server 18 generates a challenge status to the WED 16 indicating the WED 16 connection has failed at 552 and the method may end.

In FIG. 22, the message request between the vehicle 14 and the remote server 18 is authorized through direct communication between the OBT 12 and the vehicle 14 with the challenge/response being in a connected state. For example, the WED 16 generates a connection request to the remote server 18 that includes an identifier of the function at 554. The remote server 18 encrypts a current sequence number at 556 and generates a challenge request to the WED 16 that includes the sequence number at 558.

The WED 16, in turn, generates a challenge request to the OBT 12 that includes the sequence number at 560. The OBT 12 encrypts the sequence number using the secret key stored during the pairing process at 562. The OBT 12 generates a challenge response including the encrypted sequence number and the vehicle identification number to the WED 16 at 564. The WED 16, in turn, generates a challenge response to the remote server 18 including the encrypted sequence number and the vehicle identification number at 566.

Upon receipt of the encrypted sequence number and the vehicle identification number, the remote server 18 compares the received vehicle identification number and the received encrypted sequence number with the server vehicle identification number and the server encrypted sequence number respectively at 568. If the received encrypted sequence number matches the server encrypted sequence number and the received vehicle identification number matches the server vehicle identification number, then the remote server 18 generates a message request to the vehicle 14 that includes a vehicle 14 message including the function identifier to the vehicle 14 at 570 and generates a challenge status to the WED 16 indicating the WED 16 connection is authorized at 572. The vehicle 14 performs the function associated with the function identifier at 574. If, however, the received encrypted sequence number does not match the server encrypted sequence number or the received vehicle identification number does not match the server vehicle identification number, then the remote server 18 generates a challenge status to the WED 16 indicating the WED 16 connection has failed at 576 and the method may end.

Each of the figure sets 5 and 6, 7 and 8, 9 and 10, 11 and 12, 13 and 14, 15 and 15, 17 and 18, 19 and 20, and 21 and 22 illustrate the authorization request and the message request being separate communications, where the authorization is performed in a first session and the message request is performed once the authorization is received in a second session. In various other embodiments, the steps associated with the authorization request and the message request can be combined in a single session. For example, the connection request can include the UID and the function identifier.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A portable communication device for communicating with a vehicle, comprising:
   memory that stores vehicle specific information, and
   at least one processor that executes instructions that cause the portable communication device to enable a secure communication between a personal wireless end device other than the portable communication device and the vehicle based on the vehicle specific information.

2. The portable communication device of claim 1 wherein the instructions further cause the portable communication device to enable the secure communicate between the personal wireless end device other than the portable communication device and the vehicle by communicating directly with the vehicle.

3. The portable communication device of claim 1 wherein the instructions further cause the portable communication device to enable the secure communication between the personal wireless end device other than the portable communication device and the vehicle by communicating indirectly with the vehicle through a remote server.

4. The portable communication device of claim 3 wherein the instructions further cause the portable communication device to enable the secure communication between the personal wireless end device other than the portable communication device and the vehicle by communicating indirectly with the vehicle through the personal wireless end device communicating with the remote server.

5. The portable communication device of claim 1 wherein the instructions further cause the portable communication device to enable the secure communication between the personal wireless end device other than the portable communication device and the vehicle by communicating directly with the personal wireless end device.

6. The portable communication device of claim 1 wherein the instructions further cause the portable communication device to enable the secure communication between the personal wireless end device other than the portable communication device and the vehicle by communicating directly with the personal wireless end device and directly with the vehicle.

7. The portable communication device of claim 1 wherein the instructions cause the portable communication device to receive the vehicle specific information from the vehicle.

8. The portable communication device of claim 7 wherein the instructions cause the portable communication device to receive the vehicle specific information from the vehicle using a connected communication.

9. The portable communication device of claim 7 wherein the instructions cause the portable communication device to receive the vehicle specific information from the vehicle based on a proximity of the portable communication device to the vehicle.

10. The portable communication device of claim 7 wherein the instructions further cause the portable communication device to receive the vehicle specific information from the vehicle based on a proximity of the portable communication device and the personal wireless end device to the vehicle.

11. The portable communication device of claim 1 wherein the vehicle specific information comprises encryption information.

12. The portable communication device of claim 11 wherein the encryption information comprises an encryption key.

13. The portable communication device of claim 1 wherein the vehicle specific information comprises encryption information and a vehicle identification number.

14. The portable communication device of claim 1 wherein the instructions cause the portable communication device to send information about the portable communication device to the vehicle.

15. The portable communication device of claim 1 wherein the instructions cause the portable communication device to receive information about the personal wireless end device.

16. The portable communication device of claim 15 wherein the instructions cause the portable communication device to send the information about the personal wireless end device to the vehicle.

17. The portable communication device of claim 1 wherein the instructions cause the portable communication device to receive data from the vehicle using a connectionless communication.

18. The portable communication device of claim 1 wherein the instructions cause the portable communication device to receive data from the vehicle and to encrypt the data from the vehicles using the vehicle specific information.

19. The portable communication device of claim 18 wherein the instructions cause the portable communication device to send the encrypted data to the vehicle using a connectionless communication.

20. The portable communication device of claim 18 wherein the instructions cause the portable communication device to send the encrypted data to the wireless end device using a connected communication.

21. The portable communication device of claim 1 wherein the instructions cause the portable communication device to receive data from the personal wireless end device using a connected communication.

22. The portable communication device of claim 1 wherein the instructions cause the portable communication device to receive data from the personal wireless end device and to encrypt the data from the personal wireless end device using the vehicle specific information.

23. The portable communication device of claim 22 wherein the instructions cause the portable communication device to send the encrypted data to the personal wireless end device using a connected communication.

24. The portable communication device of claim 22 wherein the instructions cause the portable communication device to send the encrypted data to the vehicle using a connectionless communication.

25. The portable communication device of claim 1 wherein the instructions cause the portable communication device to receive data from the personal wireless end device, to encrypt the data from the personal wireless end device using the vehicle specific information, to receive the data from the vehicle, and to encrypt the data from the vehicle using the vehicle specific information.

26. The portable communication device of claim 25 wherein the instructions cause the portable communication device to send the encrypted data from the vehicle to the vehicle using a connectionless communication, and to send the encrypted data from the personal wireless end device to the wireless end device using a connected communication.

* * * * *